(12) United States Patent
Okuyama

(10) Patent No.: US 7,193,429 B2
(45) Date of Patent: Mar. 20, 2007

(54) SERIAL DATA COMMUNICATION SYSTEM HAVING PLURALITY OF DATA TRANSMISSION PATHS

(75) Inventor: Ken Okuyama, Ichikawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 386 days.

(21) Appl. No.: 10/769,087

(22) Filed: Jan. 29, 2004

(65) Prior Publication Data

US 2005/0111604 A1 May 26, 2005

(30) Foreign Application Priority Data

Nov. 21, 2003 (JP) ............................. 2003-393036

(51) Int. Cl.
*H03K 17/16* (2006.01)
(52) U.S. Cl. ........................................ 326/26; 326/82
(58) Field of Classification Search ................ 326/82, 326/83, 86, 87, 93–96
See application file for complete search history.

(56) References Cited

U.S. PATENT DOCUMENTS

| 5,185,863 | A | * | 2/1993 | Hamstra et al. ............... 710/61 |
| 5,323,426 | A | | 6/1994 | James et al. |
| 6,359,815 | B1 | * | 3/2002 | Sato et al. ................... 365/198 |
| 6,466,589 | B1 | * | 10/2002 | Chou ......................... 370/518 |
| 6,536,025 | B2 | * | 3/2003 | Kennedy et al. ............... 716/6 |
| 7,054,331 | B1 | * | 5/2006 | Susnow et al. ............. 370/465 |

\* cited by examiner

*Primary Examiner*—Don Le
(74) *Attorney, Agent, or Firm*—DLA Piper US LLP

(57) ABSTRACT

Data is serially transferred from an IC1 to an IC2 through a plurality of data transmission paths. Elastic buffers are connected to the plurality of signal paths corresponding the plurality of data transmission paths. A skew adjustment circuit cancels a skew of data strings generated between the plurality of signal paths by a synchronizing process in the elastic buffer. Cancellation of a skew is executed on the basis of a buffer status and a control signal representing process contents in the elastic buffer. A skew generated between the plurality of signal paths of the system having the elastic buffer is canceled.

17 Claims, 25 Drawing Sheets

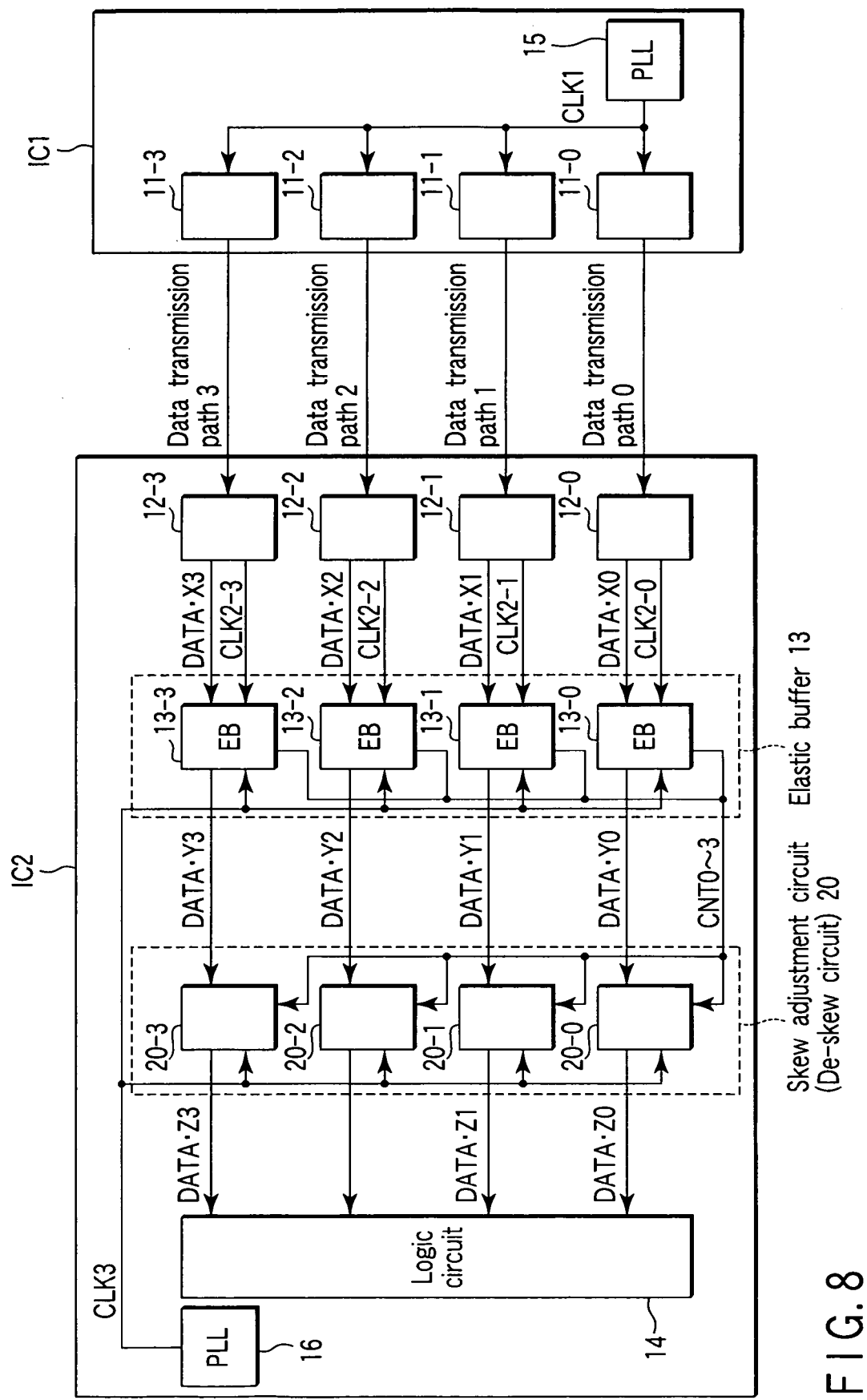
F I G. 8

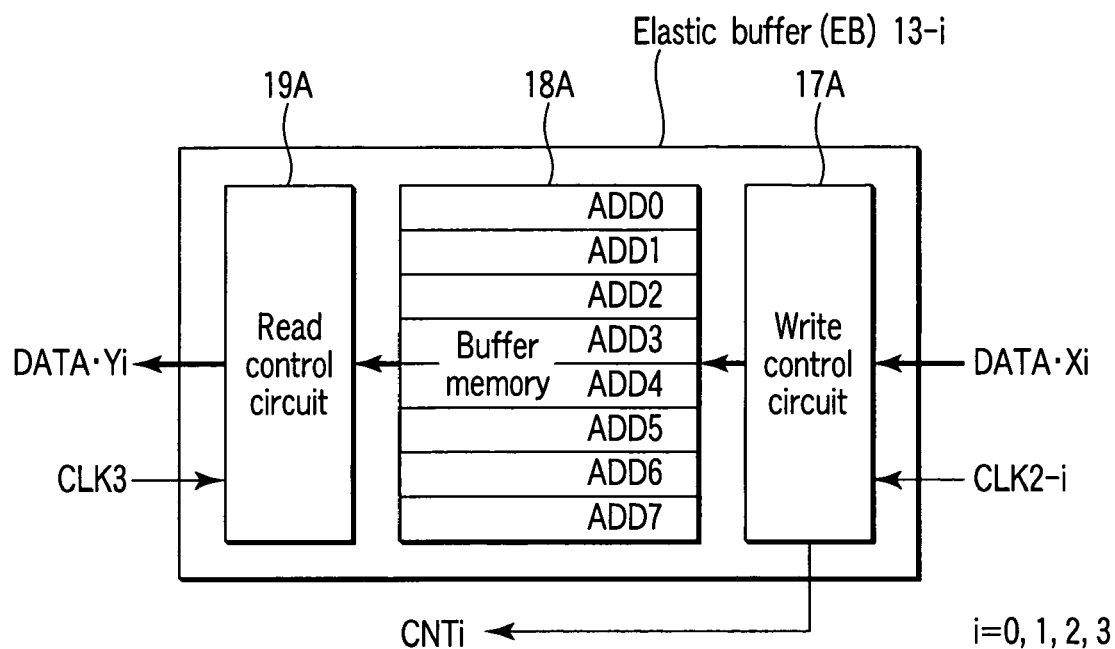
F I G. 9
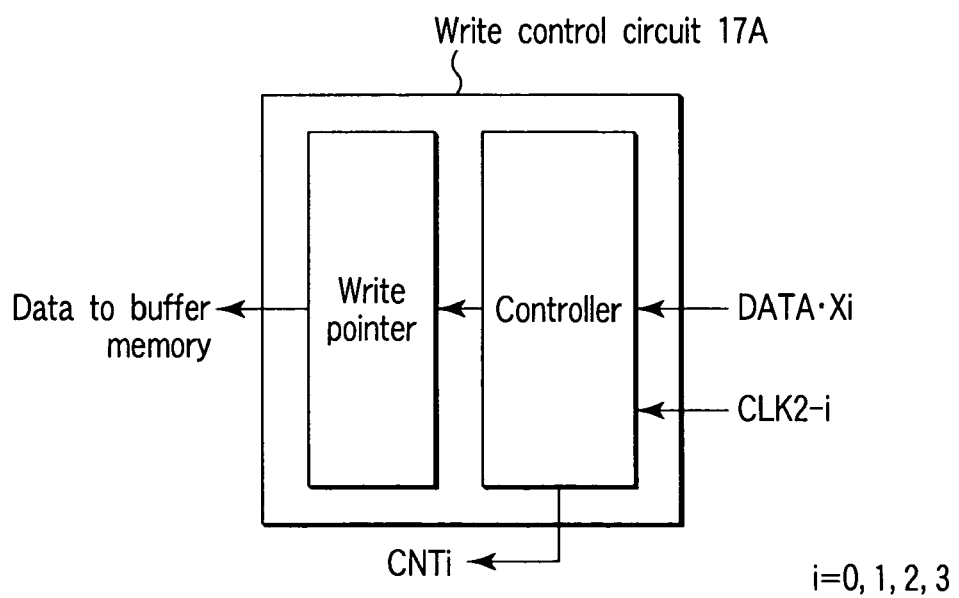
F I G. 10

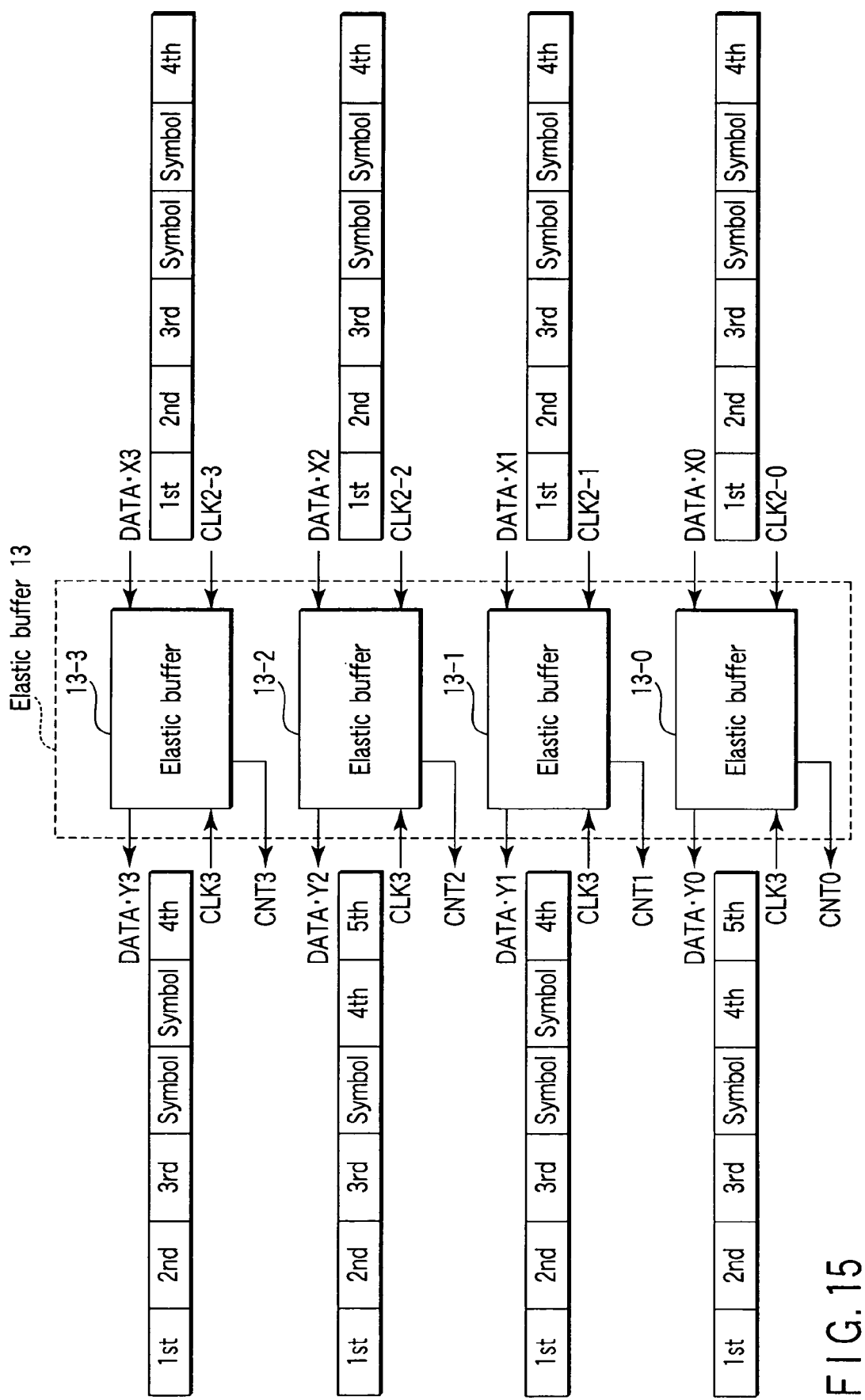
F I G. 15

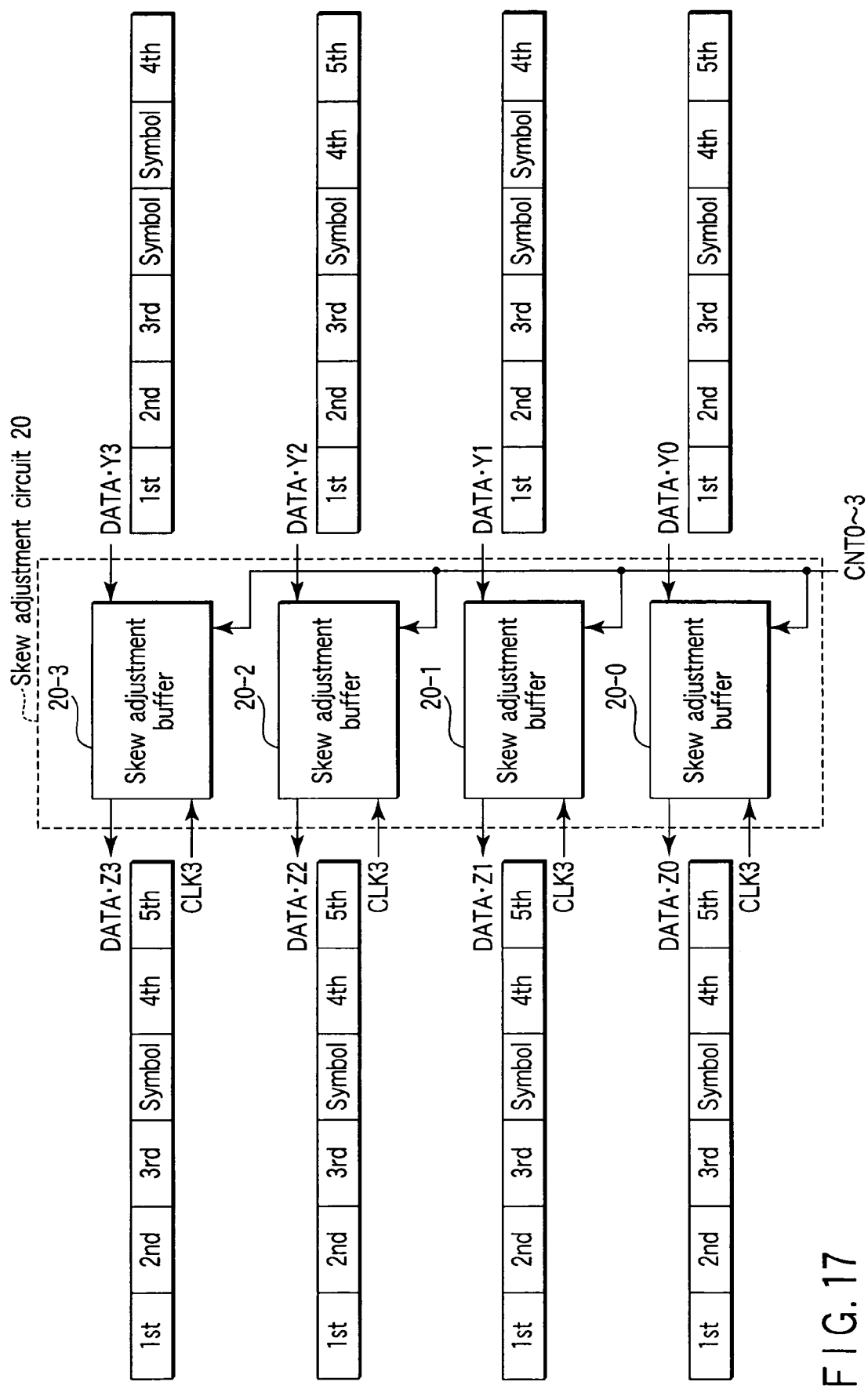
F I G. 17

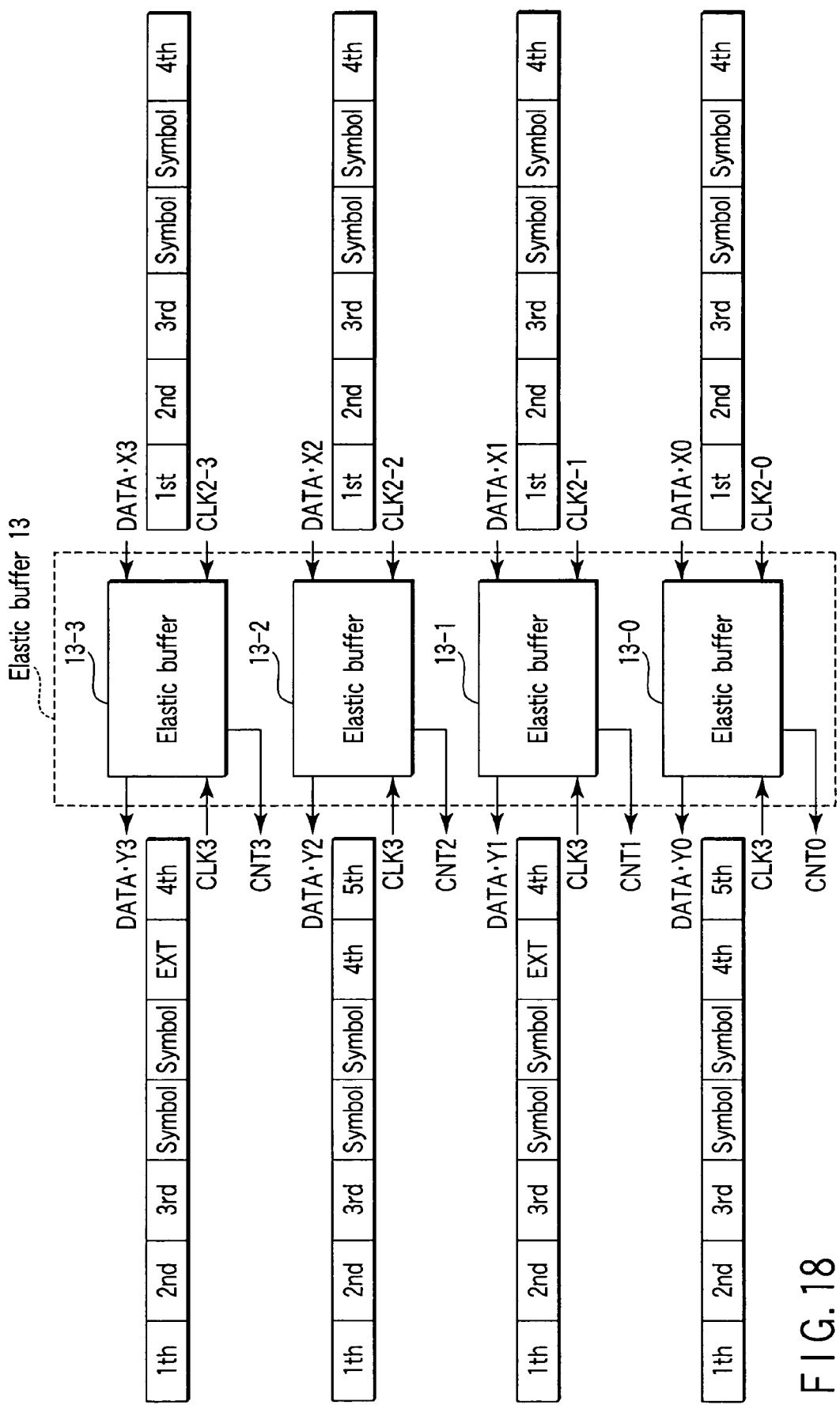
F I G. 18

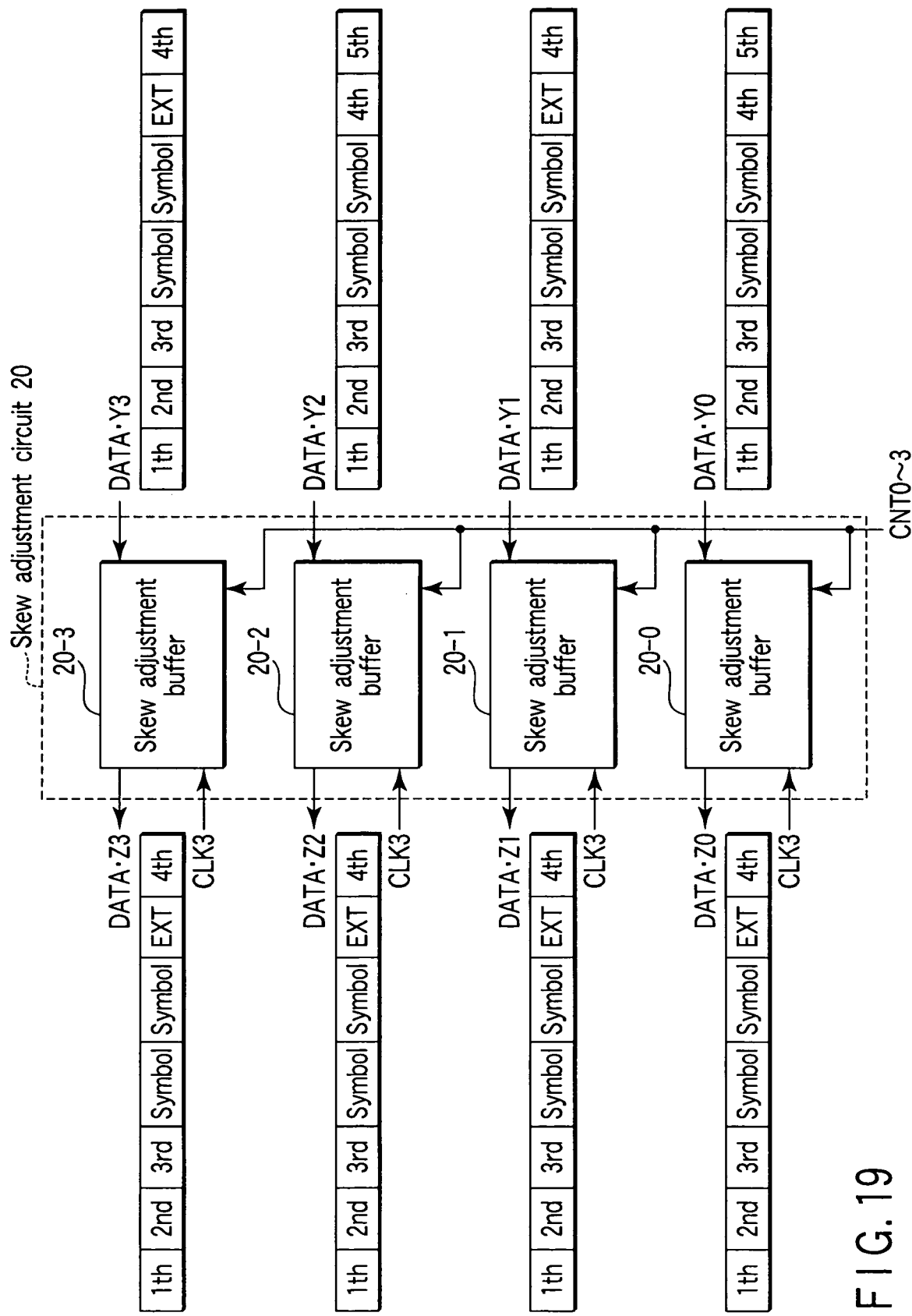
F I G. 19

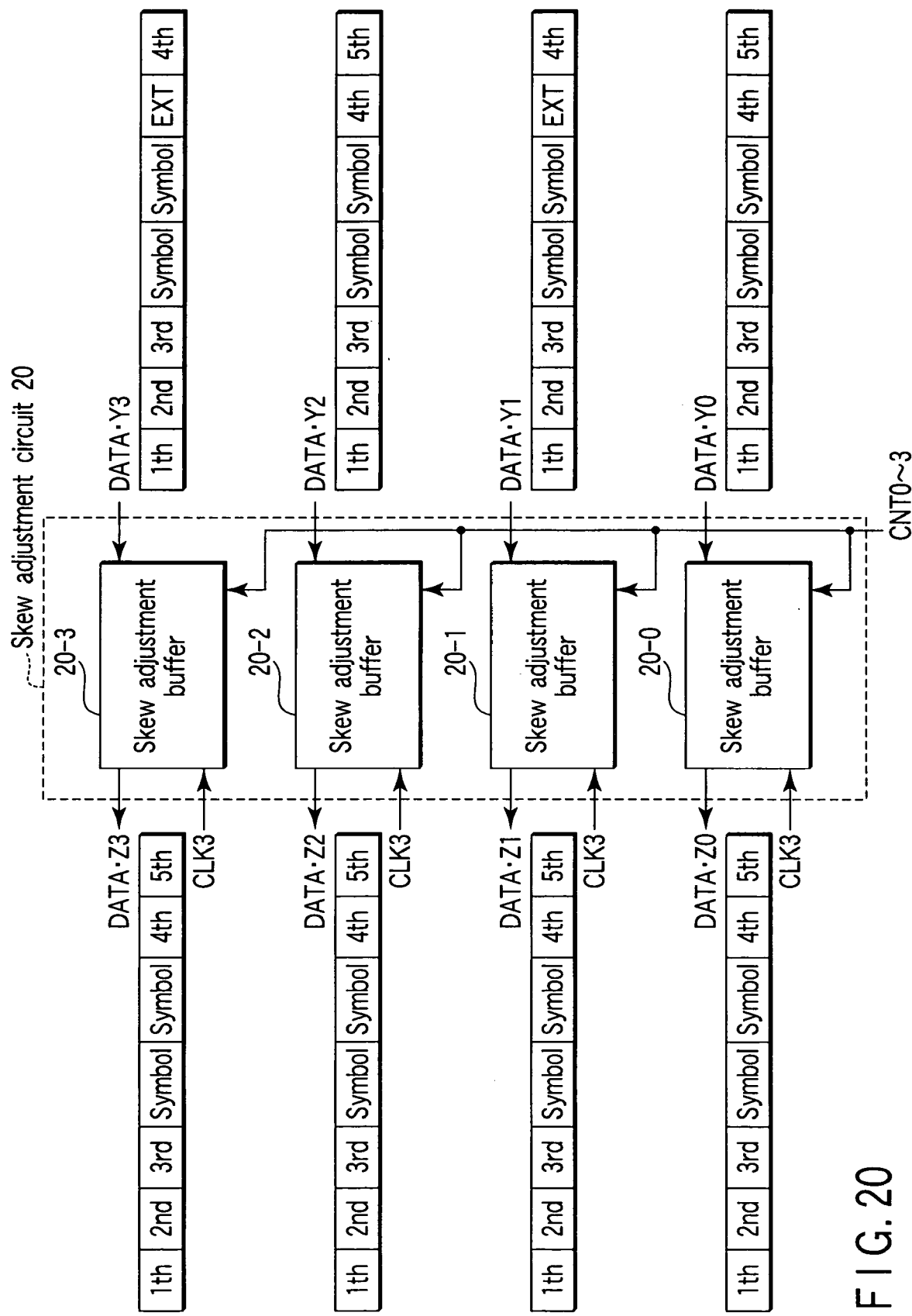
F I G. 20

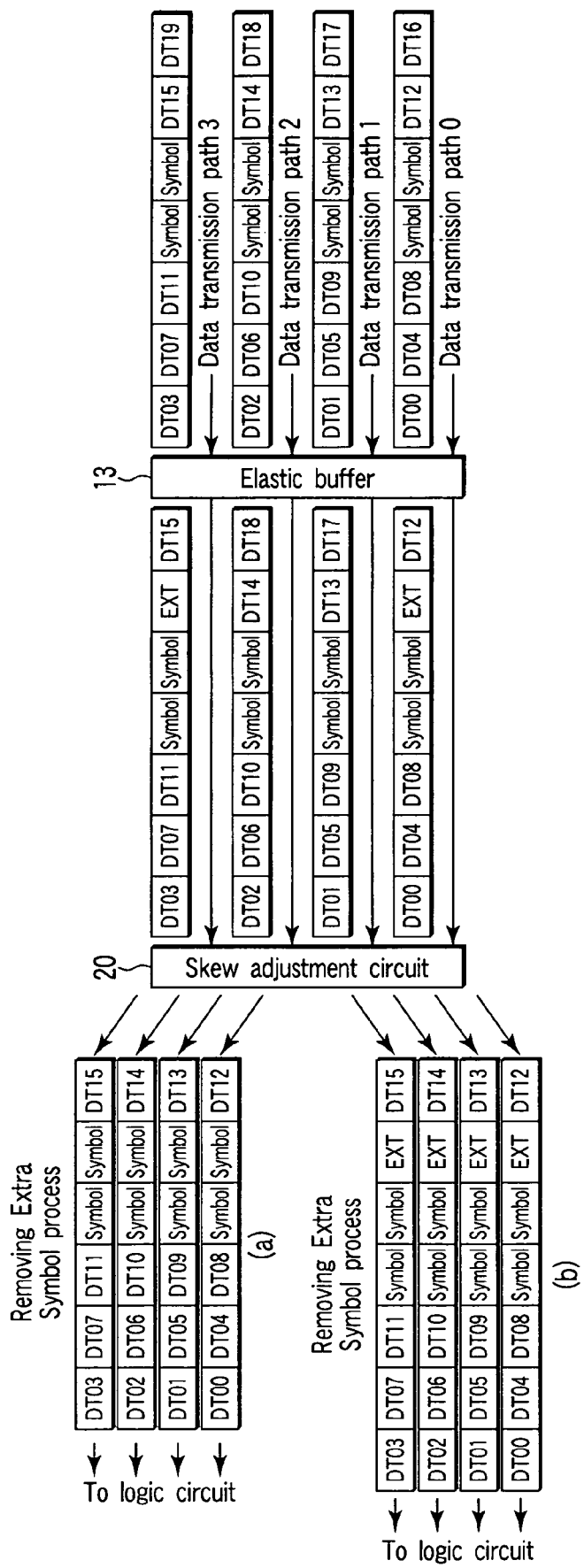
F I G. 26

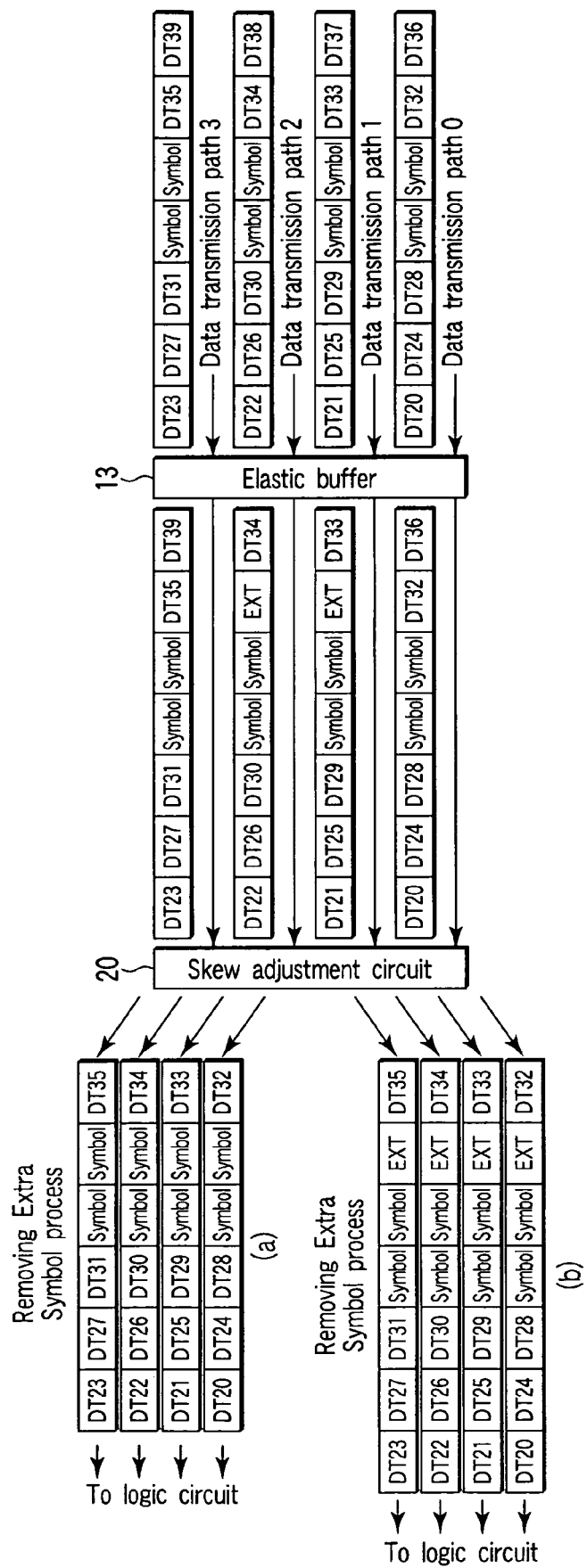
F I G. 27

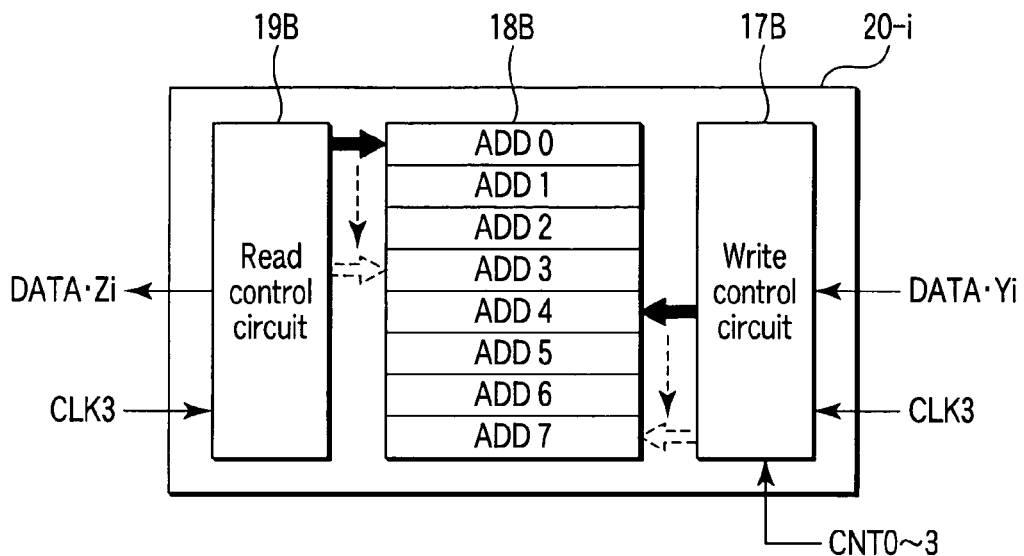

← : Write address ADDj designated by write pointer
Principle : Write address ADDj (j = 0, 1, ... 7) one by one in synchronism with clock signal CLK3
Exception : Write address ADDj is fixed for 1 clock, or write address ADDj is incremented by +2 on the basis of CNT0 to 3

→ : Read address ADDk designated by read pointer read address ADDk (k = 0, 1, ... 7) one by one in synchronism with clock signal CLK3 (free run)

FIG. 28

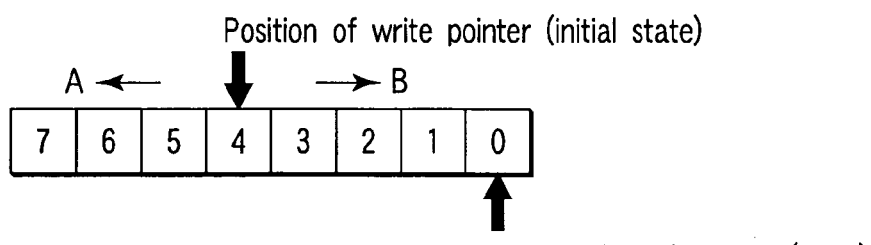

Position of write pointer :
① Shifted by +1 in direction A when Replicate Extra Symbol process is performed
② Shifted by −1 in direction A when Removing Extra Symbol process is performed

FIG. 29

SERIAL DATA COMMUNICATION SYSTEM HAVING PLURALITY OF DATA TRANSMISSION PATHS

CROSS-REFERENCE TO RELATED APPLICATIONS

This application is based upon and claims the benefit of priority from the prior Japanese Patent Application No. 2003-393036, filed Nov. 21, 2003, the entire contents of which are incorporated herein by reference.

BACKGROUND OF THE INVENTION

1. Field of the Invention

The present invention relates to a serial data communication system having a plurality of data transmission paths and especially used in a semiconductor integrated circuit having an elastic buffer.

2. Description of the Related Art

A conventional synchronizing operation executed by an elastic buffer is popularly employed in the field of serial data communication. According to a communication system using the elastic buffer, a timing difference between a clock signal on a data transmission side and a clock signal on a data reception side can be controlled by removal or replication of data called an Extra symbol.

A communication system using an elastic buffer will be described below.

FIG. 1 shows an example of the communication system using the elastic buffer.

A data-transmission-side semiconductor integrated circuit IC has an output control circuit 11 and a PLL circuit 15 for generating a clock signal CLK1. The output control circuit 11 has analog circuit (parallel-serial conversion circuit or the like) arranged for, e.g., data transmission. Data DATA.X is output to a data transmission path by the analog circuit and then supplied to a data-reception-side semiconductor integrated circuit IC2.

The data-reception-side semiconductor integrated circuit IC2 has a restoration circuit 12, an elastic buffer (EB) 13, a logic circuit 14, and a PLL circuit 16. The restoration circuit 12 has an analog circuit (serial-parallel conversion circuit or the like) arranged for data reception. The restoration circuit 12 restores a clock signal CLK2.

As the clock signal CLK2, for example, a signal transmitted from the data-transmission-side semiconductor integrated circuit IC1 may be directly used.

The restored data DATA.X, the clock signal CLK2, and a clock signal CLK3 generated by the PLL circuit 16 are input to the elastic buffer 13. The elastic buffer 13, for example, as shown in FIG. 2, is constituted by, e.g., a write control circuit 17, a buffer memory 18, and a read control circuit 19.

The write control circuit 17 sequentially writes the data DATA.X at addresses ADD0, ADD2, . . . , ADD7 of the buffer memory in synchronism with the clock signal CLK2. The read control circuit 19 sequentially reads data DATA.Y from the addresses ADD0, ADD2, . . . , ADD7 of the buffer memory in synchronism with the clock signal CLK3.

The elastic buffer 13 performs a synchronizing operation by means of removal or replication of an extra symbol to cancel a difference generated between the clock signal CLK2 and the clock signal CLK3.

The data DATA.Y output from the elastic buffer 13 is supplied to the logic circuit 14.

FIGS. 3 to 5 show examples of synchronizing operations in elastic buffers.

A timing at which a synchronizing operation is performed is determined by the data-transmission-side semiconductor integrated circuit ("IC1" in FIG. 1). More specifically, the data-transmission-side semiconductor integrated circuit includes an extra symbol "Symbol" for a synchronizing operation in a part of the data DATA.X.

The elastic buffer 13 in the data-reception side semiconductor integrated circuit ("IC2" in FIG. 1) performs the following processes on the basis of the extra symbol "Symbol".

(1) When a difference between the clock signal CLK2 and the clock signal CLK3 falls within a predetermined range, as shown in FIG. 3, the extra symbol "Symbol" is directly transmitted.

(2) The frequency of the clock signal CLK2 is higher than the frequency of the clock signal CLK3, a write speed to the buffer memory is higher than a read speed. Therefore, when the difference between the clock signal CLK2 and the clock signal CLK3 is larger than the maximum value in the predetermined range, as shown in FIG. 4, the extra symbol "Symbol" is removed.

(3) When the frequency of the clock signal CLK2 is lower than the frequency of the clock signal CLK3, the write speed to the buffer memory is lower than the read speed. Therefore, when the difference between both the clock signals CLK2 and CLK3 is larger than the maximum value in the predetermined range, as shown in FIG. 5, a extra symbol "EXT" is replicated.

In a serial data communication system using a signal transmission path, a communication system using the above elastic buffer is a very effective technique to synchronize a data-transmission-side clock signal with a data-reception-side clock signal.

However, such an elastic technique is not always useful for a serial data communication system having a plurality of transmission paths.

FIG. 6 shows an example of a serial data communication system constituted by a plurality of transmission paths using an elastic buffer.

A system having four data transmission paths 0, 1, 2, and 3 will be described below.

The data-transmission-side semiconductor integrated circuit IC1 has output control circuits (including analog circuits such as parallel-serial conversion circuits) 11-0, 11-1, 11-2, and 11-3 in response to the data transmission paths 0, 1, 2, and 3. The clock signal CLK1 generated by the PLL circuit 15 is supplied to the output control circuits 11-0, 11-1, 11-2, and 11-3.

When the data-transmission-side semiconductor integrated circuit IC1 transmits, e.g., 32-bit data, the data-transmission-side semiconductor integrated circuit IC1 divides the 32-bit transmission data into four 8-bit data. The 8-bit data are serially output to the data transmission paths 0, 1, 2, and 3 by the output control circuits 11-0, 11-1, 11-2, and 11-3, respectively.

The data-reception-side semiconductor integrated circuit IC2 has restoring circuits (including analog circuits such as parallel-serial conversion circuits) 12-0, 12-1, 12-2, and 12-3 in response to the data transmission paths 0, 1, 2, and 3. The restoration circuit 12-0, 12-1, 12-2, and 12-3 convert the serially transmitted data into parallel data and restore clock signals CLK2-0, CLK2-1, CLK2-2, and CLK2-3.

In this case, the frequencies of the restored clock signals CLK2-0, CLK2-1, CLK2-2, and CLK2-3 may be different from each other depending on various conditions in restoration, and are not completely equal to the frequency of the clock signal CLK3.

Therefore, the clock signals CLK2-0, CLK2-1, CLK2-2, and CLK2-3 are synchronized with the clock signal CLK3 by using elastic buffers 13-0, 13-1, 13-2, and 13-3.

More specifically, the elastic buffer 13-0 corresponding to the data transmission path 0 independently performs "Removing/Replicate Extra Symbol" to synchronize the clock signal CLK2-0 with the clock signal CLK3.

Similarly, the elastic buffers 13-1, 13-2 and 13-3 corresponding to the data transmission paths 1, 2 and 3 independently perform "Removing/Replicate Extra Symbol" to synchronize the clock signals CLK2-1, CLK2-2, CLK2-3 with the clock signal CLK3.

In consideration of respective signal paths corresponding to the data transmission paths 0, 1, 2, and 3, synchronizing operations are performed by the elastic buffers 13-0, 13-1, 13-2, and 13-3. However, as described above, the frequencies of the clock signals CLK2-0, CLK2-1, CLK2-2, and CLK2-3 are different from each other.

For this reason, in consideration of the relation between the signal paths corresponding to the data transmission paths 0, 1, 2, and 3, on these signal paths, "Removing/Replicate Extra Symbol" is not always performed by the elastic buffers 13-0, 13-1, 13-2, and 13-3 at once.

Therefore, the serial communication system using a plurality of transmission paths, with respect to the respective signal paths, synchronizing operations can be independently performed by the elastic buffers 13-0, 13-1, 13-2, and 13-3. However, with respect to the relation between the signal paths, a large skew may be generation in a data string due to the difference between the frequencies of the clock signals CLK2-0, CLK2-1, CLK2-2, and CLK2-3 and processes performed by the elastic buffers 13-0, 13-1, 13-2, and 13-3.

FIG. 7 shows a manner observed when an extra symbol is removed in an elastic buffer.

In the elastic buffers 13-0 and 13-2 corresponding to the data transmission paths 0 and 2, extra symbols "Symbol" are independently removed to synchronize the clock signals CLK2-0 and CLK2-2 with the clock signal CLK3.

In this case, in the elastic buffers 13-0 and 13-2, the extra symbols "Symbol" are removed. However, in the elastic buffers 13-1 and 13-3 corresponding to the data transmission paths 1 and 3, the extra symbols "Symbol" are not removed.

Therefore, after the extra symbols are removed in the elastic buffers 13-0 and 13-2, the output timings of data DATA.Y0 and DATA.Y2 are largely different from the output timings of data DATA.Y1 and DATA.Y3.

BRIEF SUMMARY OF THE INVENTION

A semiconductor integrated circuit according to an aspect of the present invention is applied to a serial communication system having a plurality of data transmission paths, and comprises a logic circuit, a plurality of signal paths, which are arranged in relation to the plurality of data transmission paths, to transfer data to the logic circuit, a plurality of elastic buffers which are arranged on the signal paths, respectively and which perform synchronizing operations for the respective signal paths, and a skew adjustment circuit which cancels a skew of data strings generated between the plurality of signal paths.

A serial communication system according to another aspect of the present invention comprises a first IC and a second IC which are connected to each other by a serial communication system constituted by a plurality of data transmission paths. The second IC has a logic circuit, a plurality of signal paths, which are arranged in relation to the plurality of data transmission paths, to transfer data to the logic circuit, a plurality of elastic buffers which are arranged on the signal paths, respectively and which perform synchronizing operations for the respective signal paths, and a skew adjustment circuit which cancels a skew of data strings generated between the plurality of signal paths.

BRIEF DESCRIPTION OF THE SEVERAL VIEWS OF THE DRAWING

FIG. 8 is a diagram showing a communication system according to an example of the present invention.

FIG. 9 is a diagram showing an example of an elastic buffer.

FIG. 10 is a diagram showing a write control circuit in the buffer in FIG. 9.

FIG. 15 is a diagram showing the outline of an operation of an elastic buffer.

FIG. 17 is a diagram showing an outline of an operation of the skew adjustment circuit.

FIG. 18 is a diagram showing an outline of an operation of the elastic buffer.

FIG. 19 is a diagram showing an outline of an operation of the skew adjustment circuit.

FIG. 20 is a diagram showing an outline of an operation of the skew adjustment circuit.

FIG. 26 is a diagram showing a manner in which removal/replication of an extra symbol can be selected.

FIG. 27 is a diagram showing a manner in which removal/replication of an extra symbol can be selected.

FIG. 28 is a diagram showing outlines of operations of a write point and a read point.

FIG. 29 is a diagram showing a relative positional relationship between the write pointer and the read pointer.

DETAILED DESCRIPTION OF THE INVENTION

Figure 1:
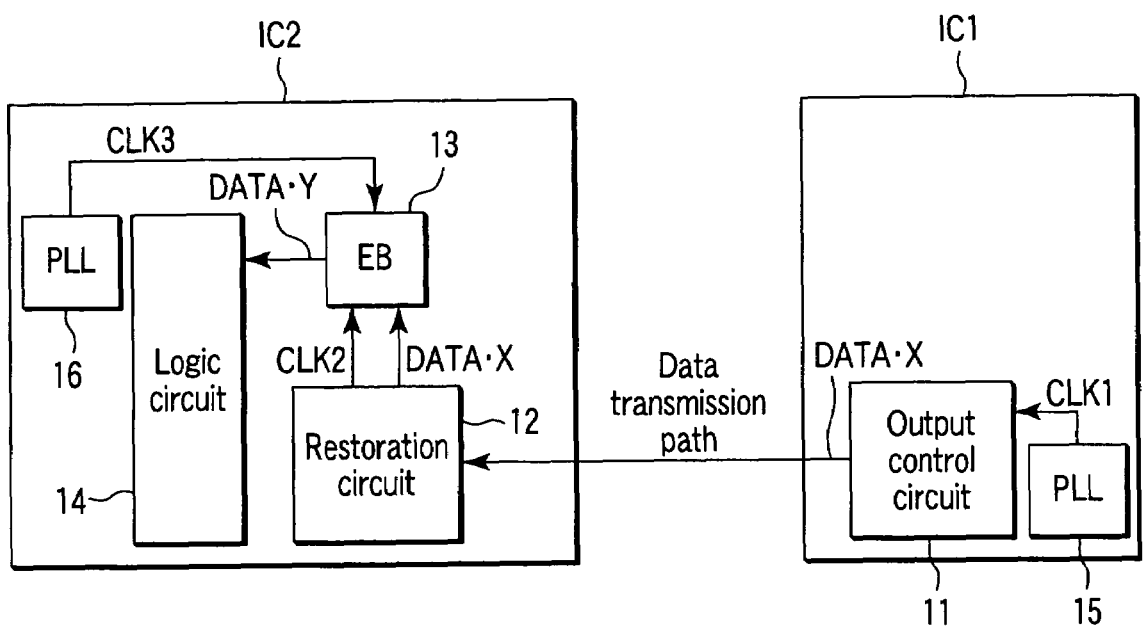
FIG. 1 is a diagram showing a conventional communication system having a single data transmission path.
Figure 2:
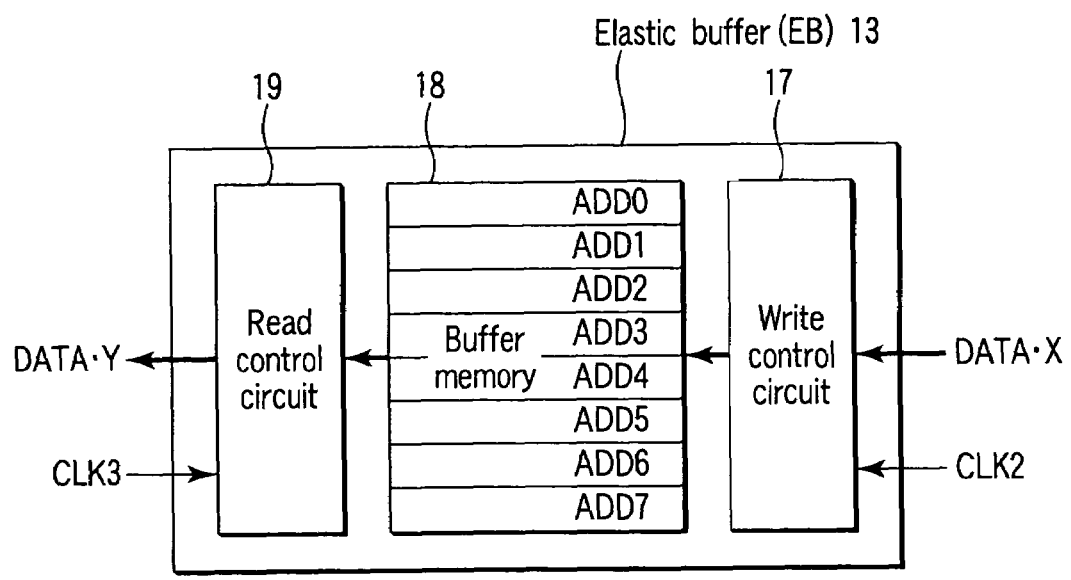
FIG. 2 is a diagram showing an example of a conventional elastic buffer.
Figure 3:
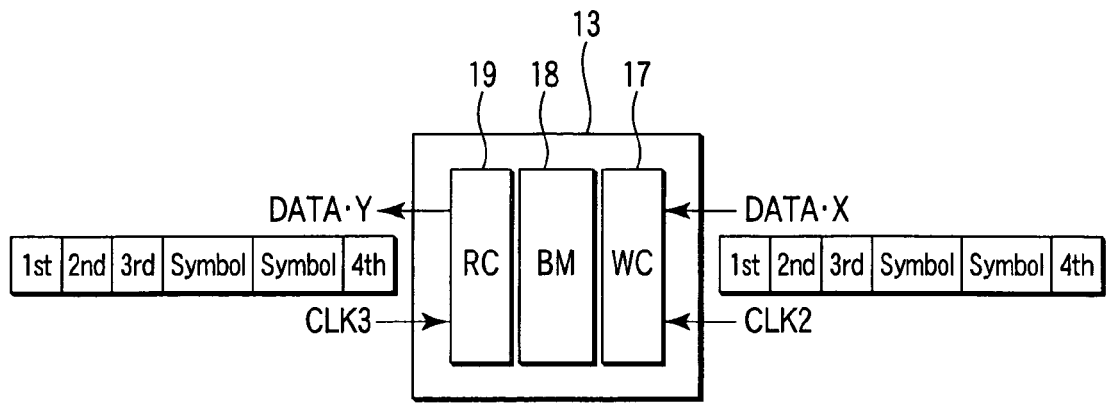
FIG. 3 is a diagram showing an operation of the conventional elastic buffer.
Figure 4:
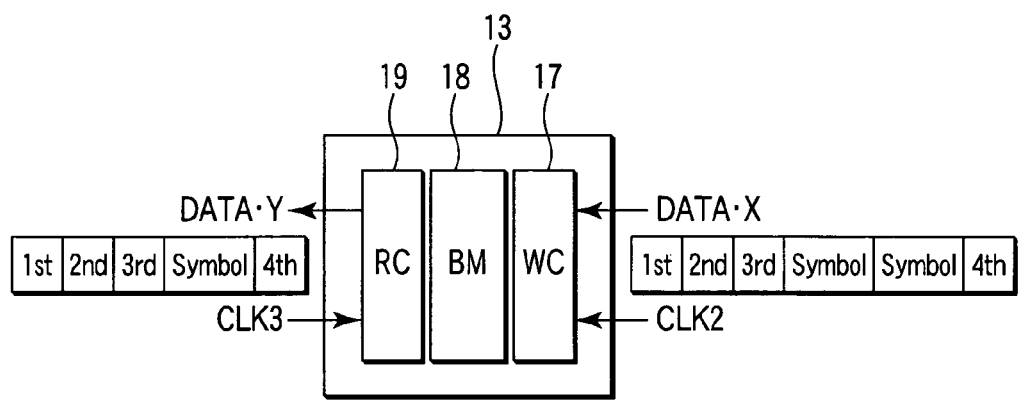
FIG. 4 is a diagram showing an operation of the conventional elastic buffer.
Figure 5:
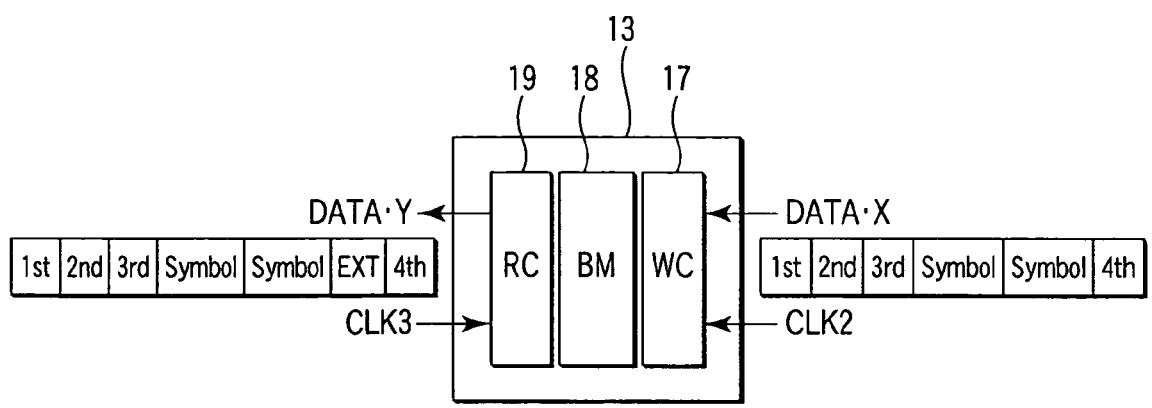
FIG. 5 is a diagram showing an operation of the conventional elastic buffer.
Figure 6:
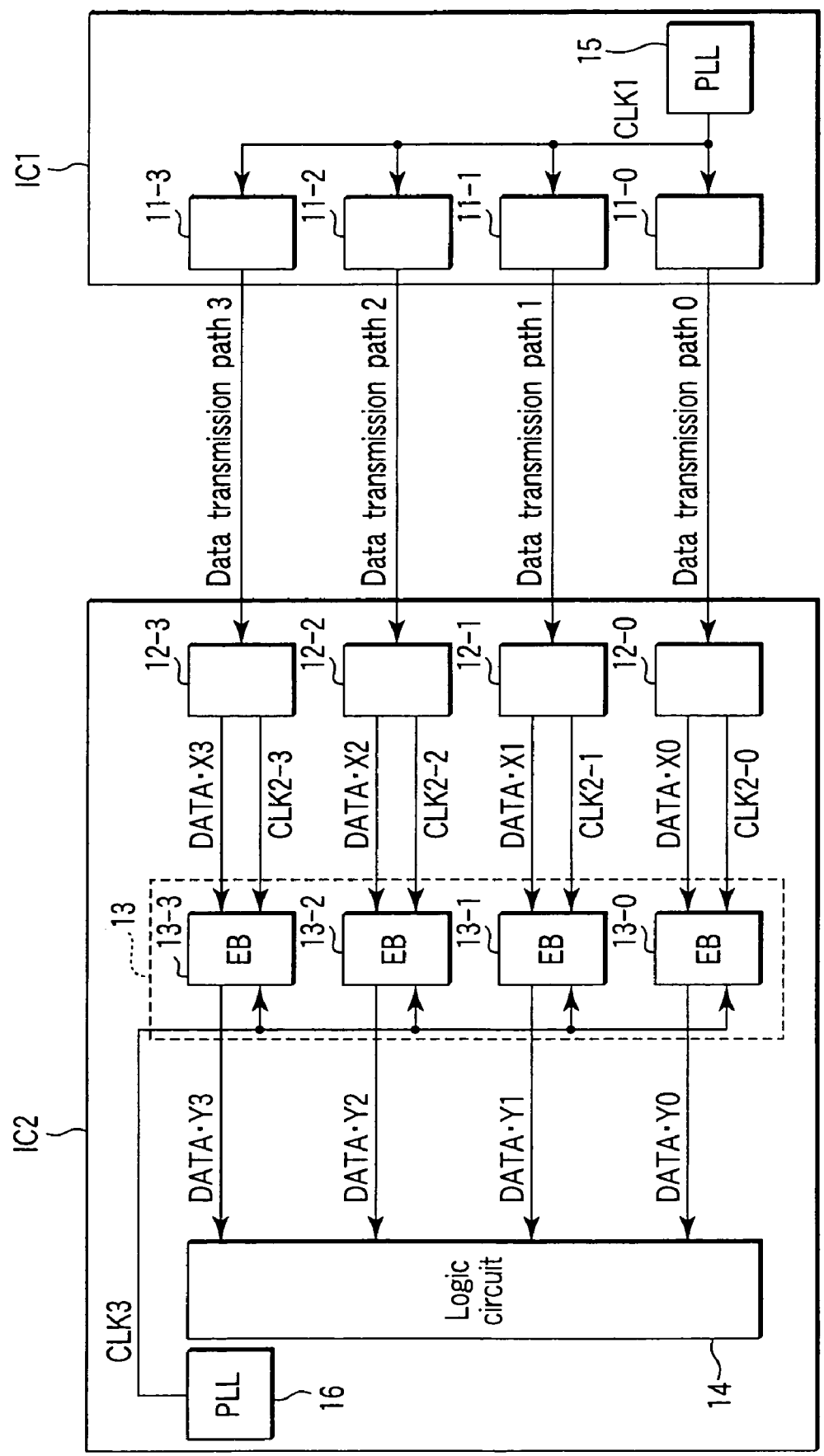
FIG. 6 is a diagram showing a conventional communication system having a plurality of data transmission paths.
Figure 7:
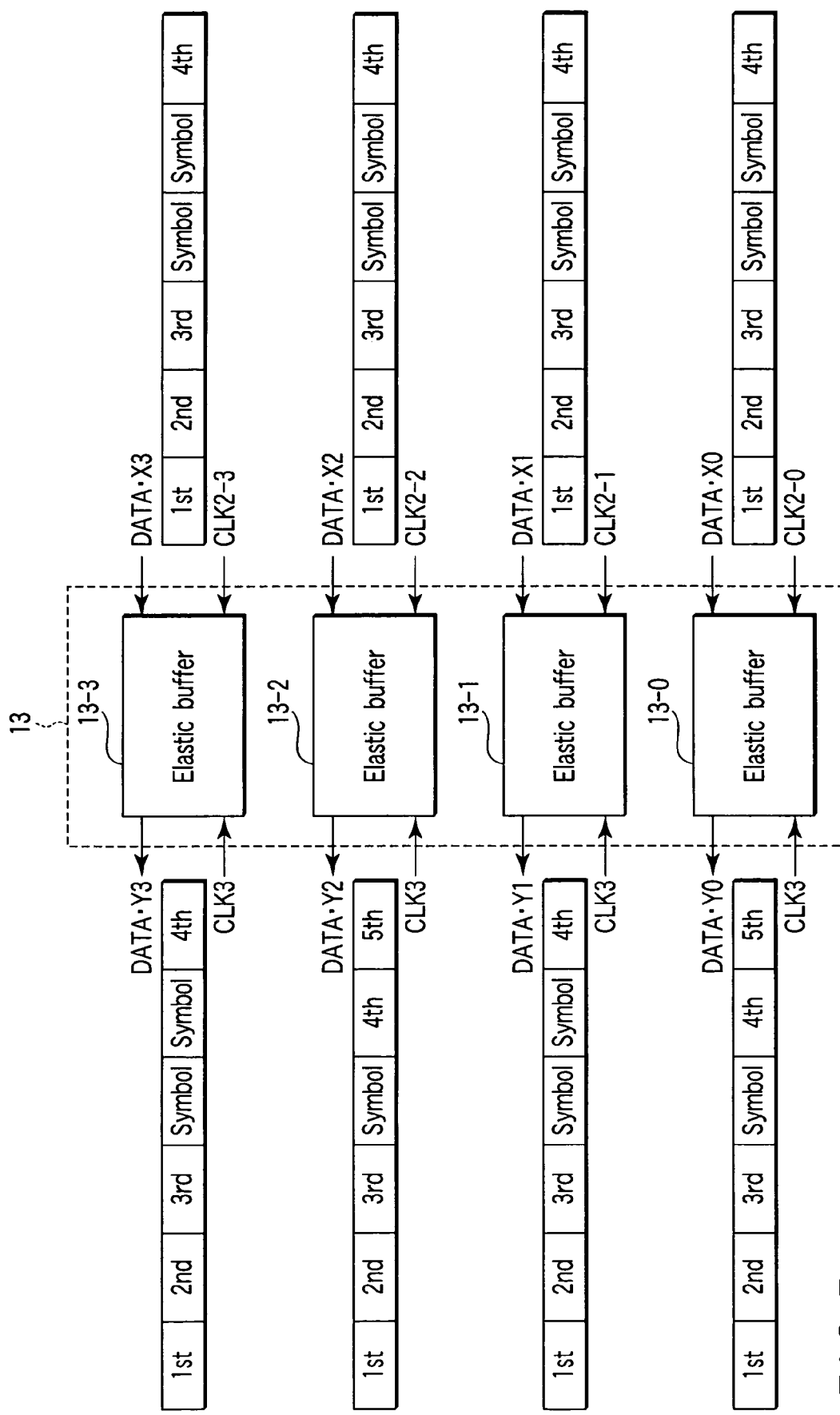
FIG. 7 is a diagram showing an operation of the elastic buffer in FIG. 6.

A best mode for carrying out the invention will be described below with reference to the accompanying drawings.

FIG. 8 shows a communication system having a plurality of data transmission paths according to an example of the invention.

In this example, the communication system having four data transmission paths will be described.

The data-transmission-side semiconductor integrated circuit IC1 has output control circuits 11-0, 11-1, 11-2, and 11-3 and a PLL circuit 15 for generating a clock signal CLK1.

The output control circuits 11-0, 11-1, 11-2, and 11-3 have analog circuits (parallel-serial conversion circuits or the like) for, e.g., data transmission.

The transmitted data is divided into, e.g., four data (DATA.X0, DATA.X1, DATA.X2, and DATA.X3). The data DATA.X0, DATA.X1, DATA.X2, and DATA.X3 are serially output from the output control circuits 11-0, 11-1, 11-2, and 11-3 to data transmission paths-0, 1, 2, and 3, respectively, in synchronism with the clock CLK1.

The data-reception-side semiconductor integrated circuit IC2 has restoration circuit 12-0, 12-1, 12-2, and 12-3, an elastic buffer (EB) 13, a logic circuit 14, a PLL circuit 16, and a skew adjustment circuit (De-skew circuit) 20.

The restoration circuits 12-0, 12-1, 12-2, and 12-3 have analog circuits (parallel-serial conversion circuits or the like) for data reception. The restoration circuits 12-0, 12-1, 12-2, and 12-3 convert the serially transferred data into parallel data and restore clock signals CLK2-0, CLK2-1, CLK2-2, and CLK2-3.

As the clock signals CLK2-0, CLK2-1, CLK2-2, and CLK2-3, for example, the signals transmitted from the data-transmission-side semiconductor integrated circuit IC1 may be directly used.

The frequencies of the clock signals CLK2-0, CLK2-1, CLK2-2, and CLK2-3 are not completely equal to the frequency of the clock signal CLK3 in the semiconductor integrated circuit IC2 depending on various conditions in restoration by the analog circuits.

More specifically, the clock signals CLK2-0, CLK2-1, CLK2-2, and CLK2-3 are not completely synchronized with the clock signal CLK3.

Between the signal paths in the data-reception-side semiconductor integrated circuit IC2 corresponding to the data transmission paths 0, 1, 2, and 3, the frequencies of the clock signals CLK2-0, CLK2-1, CLK2-2, and CLK2-3 are not completely equal to each other depending on various conditions in restoration by the analog circuits.

More specifically, the frequencies of the clock signals CLK2-0, CLK2-1, CLK2-2, and CLK2-3 may be different from each other.

The clock signals CLK2-0, CLK2-1, CLK2-2, and CLK2-3 and the clock signal CLK3 are synchronized with each other by the elastic buffers 13-0, 13-1, 13-2, and 13-3, respectively.

The synchronizing operations in the elastic buffers 13-0, 13-1, 13-2, and 13-3 are executed by, e.g., "Removing/ Replicate Extra Symbol". However, this is only an example. In the example of the present invention, a method of synchronization in the elastic buffers 13-0, 13-1, 13-2, and 13-3 are not limited to a specific method.

The configurations of the elastic buffers 13-0, 13-1, 13-2, and 13-3 are, e.g., configurations shown in FIG. 9. In this example, each of the elastic buffers 13-0, 13-1, 13-2, and 13-3 is constituted by a write control circuit 17A, a buffer memory 18, a read control circuit 19A.

The write control circuit 17A sequentially writes data DATA.Xi at addresses ADD0, ADD2, . . . , ADD7 of the buffer memory in synchronism with the clock signal CLK3-$i$ ($i$=0, 1, 2, and 3).

As the configurations of the elastic buffers 13-0, 13-1, 13-2, and 13-3, any configurations which can achieve synchronization between the clock signals CLK2-0, CLK2-1, CLK2-2, and CLK2-3 and the clock signal CLK3 may be used.

In the example of the present invention, the elastic buffers 13-0, 13-1, 13-2, and 13-3 must have functions for outputting control signals CNT0, CNT1, CNT2, and CNT3 representing the contents of at least processes which are performed by the buffers themselves, respectively.

The write control circuit 17A, for example, as shown in FIG. 10, is constituted by a controller and a write pointer. A control signal CNTi representing the contents of a process performed by the elastic buffer 13-$i$ is output from, e.g., the controller in the write control circuit 17A.

Figure 11:
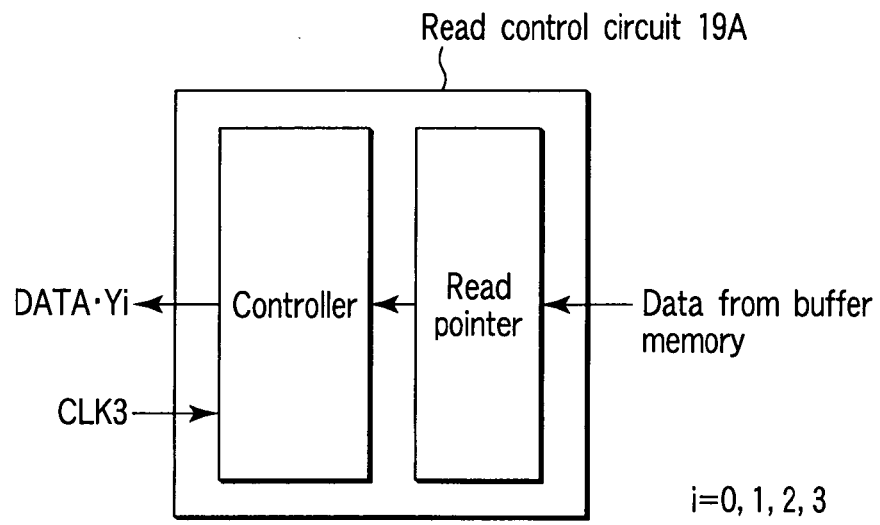
FIG. 11 is a diagram showing a read control circuit in the buffer in FIG. 9.

The read control circuit 19A sequentially reads data DATA.Yi from the addresses ADD0, ADD2, . . . , ADD7 of the buffer memory in synchronism with the clock signal CLK3. The read control circuit 19A, for example, as shown in FIG. 11, is constituted by a controller and a read pointer.

A skew of data strings generated between a plurality of signal paths due to the differences between the clock signals CLK2-0, CLK2-1, CLK2-2, and CLK2-3 is canceled by using the skew adjustment circuit (De-skew circuit) 20.

The difference (skew) of data strings generated between the plurality of signal paths, for example, is canceled by skew adjustment buffers (De-skew buffers) 20-0, 20-1, 20-2, and 20-3 only one of which is arranged on one of the signal paths.

Figure 12:
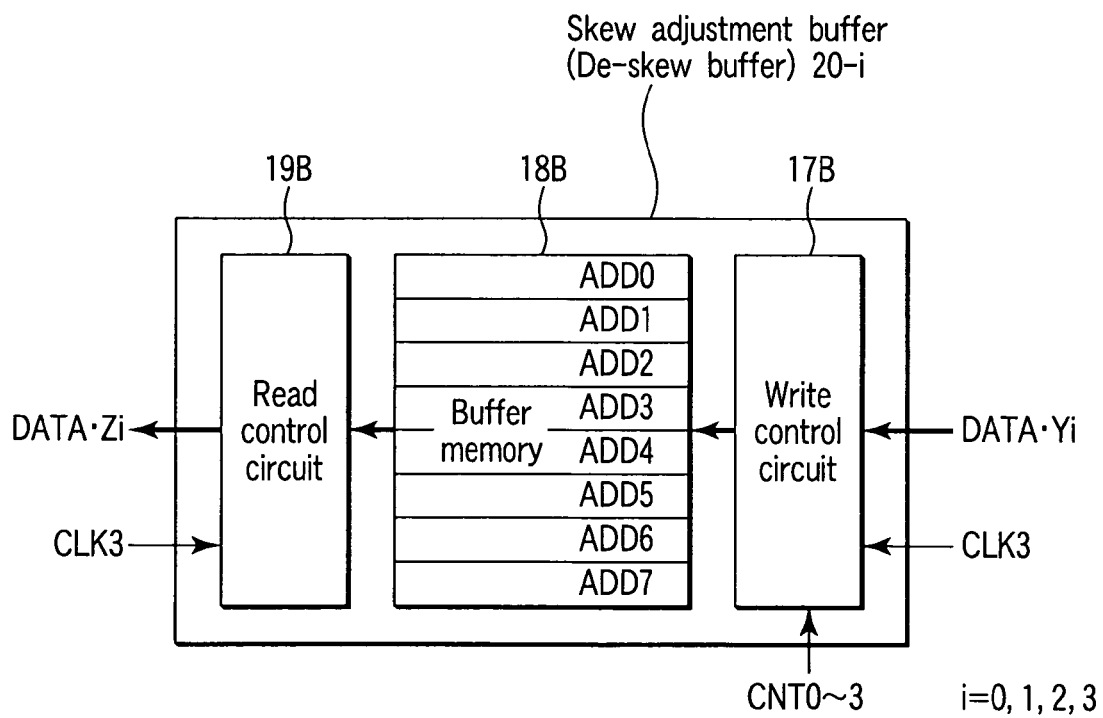
FIG. 12 is a diagram showing an example of a skew adjustment buffer.

The configurations of the skew adjustment buffers 20-0, 20-1, 20-2, and 20-3 are, e.g., configurations shown in FIG. 12. In this example, each of the skew adjustment buffers 20-0, 20-1, 20-2, and 20-3 is constituted by a write control circuit 17B, a buffer memory 18B, and a read control circuit 19B.

The write control circuit 17B sequentially writes data DATA.Yi at addresses ADD0, ADD2, . . . , ADD7 of the buffer memory in synchronism with the clock signal CLK3-$i$ ($i$=0, 1, 2, and 3).

As the configurations of the skew adjustment buffers 20-0, 20-1, 20-2, and 20-3, any configurations which can achieve cancellation of a skew of data strings generated between the plurality of signal paths may be used.

However, in the example of the present invention, the skew adjustment buffers 20-0, 20-1, 20-2, and 20-3 determine contents of processes performed by the skew adjustment buffers themselves on the basis of the control signals CNT0, CNT1, CNT2, and CNT3 representing the contents of the processes performed by the elastic buffers 13-0, 13-1, 13-2, and 13-3.

Figure 13:
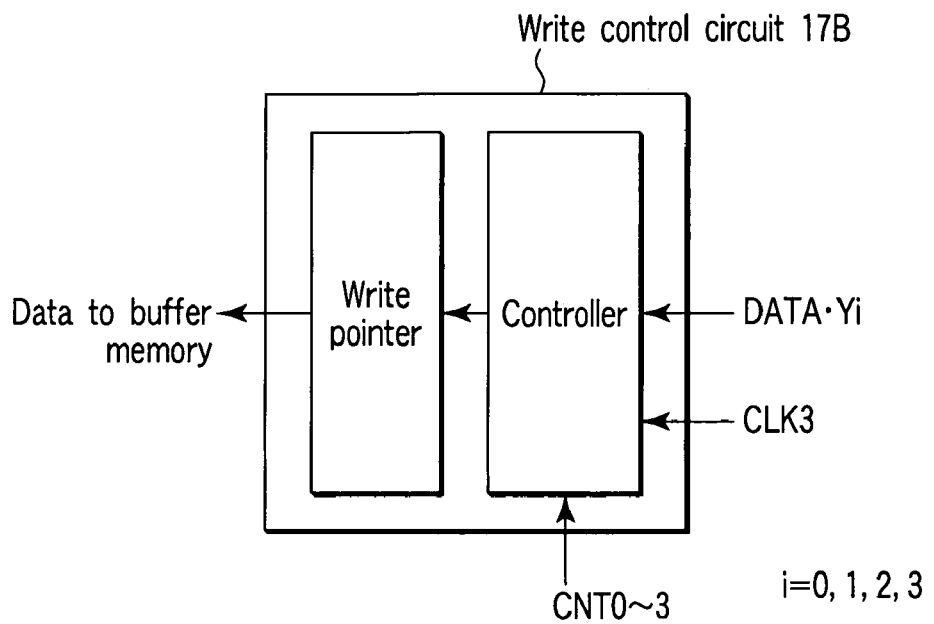
FIG. 13 is a diagram showing a write control circuit in the buffer in FIG. 12.

The write control circuit 17B, for example, as shown in FIG. 13, is constituted by a controller and a write pointer. The control signal CNTi representing the contents of a process performed by the elastic buffer 13-i is input to the controller in, e.g., the write control circuit 17B.

Figure 14:
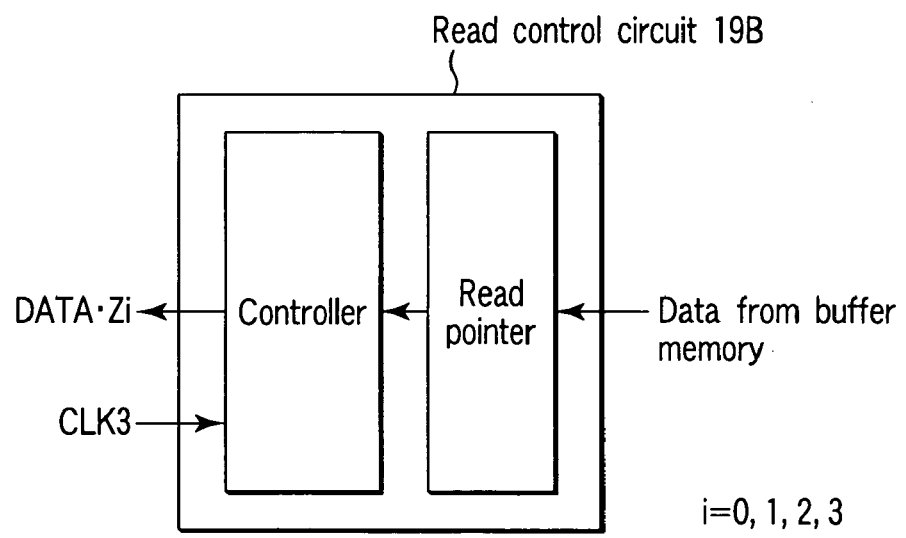
FIG. 14 is a diagram showing a read control circuit in the buffer in FIG. 12.

The read control circuit 19B sequentially reads data DATA.Zi from the addresses ADD0, ADD2, . . . , ADD7 of the buffer memory in synchronism with the clock signal CLK3. The read control circuit 19A, for example, as shown in FIG. 14, is constituted by a controller and a read pointer.

The following two processes are performed by the skew adjustment buffer 20-i.

(1) Removing Extra Symbol

This process is a process of canceling a difference (skew) of data strings generated between the plurality of signal paths corresponding to the data transmission paths 0, 1, 2, and 3 by removing an extra symbol.

The extra symbol can be removed by stopping increment of the addresses ADD0, ADD2, . . . , ADD7 of a buffer memory designated by a write pointer for the duration of one clock of the clock signal CLK3.

In this case, after an extra symbol is written at one address of a buffer memory, and the next data is overwritten at the same address as one address. For this reason, when data is read while sequentially incrementing the addresses ADD0, ADD2, . . . , ADD7 of a buffer memory designated by a read point one by one, the extra symbol is removed.

[In Case of Removal of Extra Symbol]

A: When the process of the elastic buffer 13-i on one signal path is "Replicate Extra Symbol", the "Removing Extra Symbol" is performed by the skew adjustment buffer 20-i on the signal path.

B: When both the "Removing Extra Symbol" and the "Replicate Extra Symbol" are not performed by the elastic buffer 13-i on one signal path, and when the process of the elastic buffer 13-i on at least one of all the signal paths except for one signal path is "Removing Extra Symbol", the "Removing Extra Symbol" is performed by the skew adjustment buffer 20-i on one signal path.

C: When A is applied, on the signal path on which both the "Removing Extra Symbol" and the "Replicate Extra Symbol" are not performed, the "Removing/Replicate Extra Symbol" is not performed by the skew adjustment buffer 20-i. When B is applied, on a signal path on which the "Removing Extra Symbol" is performed by the elastic buffer 13-i, the "Removing/Replicate Extra Symbol" is not performed by the skew adjustment buffer 20-i.

(2) Replicate Extra Symbol

This process is a process of canceling a skew (difference) of data strings generated between the plurality of signal paths corresponding to the data transmission paths 0, 1, 2, and 3 by replicating an extra symbol.

The replication of an extra symbol can be performed by setting increment of the addresses ADD0, ADD2, . . . , ADD7 of a buffer memory designated by a write pointer at +2 (in general, +1).

In this case, extra symbols are written at two continuous addresses at once. When the addresses ADD0, ADD2, . . . , ADD7 of a buffer memory designated by, e.g., a read pointer are sequentially incremented to read data, the extra symbols are replicated.

[In Case of Replication of Extra Symbol]

A: When both the "Removing Extra Symbol" and the "Replicate Extra Symbol" are not performed by the elastic buffer 13-i on one signal path, and when the process of the elastic buffer 13-i on at least one of all the signal paths except for one signal path is "Replicate Extra Symbol", the "Replicate Extra Symbol" is performed by the skew adjustment buffer 20-i on one signal path.

B: When the process of the elastic buffer 13-i on one signal path is "Removing Extra Symbol", the "Replicate Extra Symbol" is performed by the skew adjustment buffer 20-i on the signal path.

C: When A is applied, on the signal path on which the "Replicate Extra Symbol" is performed as a process, the "Removing/Replicate Extra Symbol" is not performed by the skew adjustment buffer 20-i. When B is applied, on a signal path on which the "Removing/Replicate Extra Symbol" is performed by the elastic buffer 13-i, the "Removing/Replicate Extra Symbol" is not performed by the skew adjustment buffer 20-i.

The contents of the process performed by the skew adjustment buffer 20-i are approximated to the contents of the process performed by the elastic buffer 13-i. These contents are different from each other by the following point. That is, a clock signal which performs write control and a clock signal which performs read control are synchronized with each other in the former (only CLK3), and these clocks are not synchronized with each other in the later (CLK2-i and CLK3).

According to the process using the above skew adjustment circuit, in a signal communication system having a plurality of data transmission paths, even though a difference (skew) of data strings is generated between a plurality of signal paths, the skew can be canceled by the skew adjustment circuit.

FIG. 15 shows a first example in which a skew is generated between the plurality of signal paths.

In the elastic buffers 13-0 and 13-2 on the data transmission paths 0 and 2, extra symbols are independently deleted to cancel skews between the clock signals CLK2-0 and CLK2-2 and the clock signals CLK3.

Therefore, from the elastic buffers 13-0 and 13-2, the data DATA.Y0 and DATA.Y2 from which extra symbols "Symbol" are removed are output. At this time, control signals CNT0 and CNT2 representing that the extra symbols are removed are also output.

In the elastic buffers 13-1 and 13-3 on the data transmission paths 1 and 3, the data DATA.X1 and DATA.X3 are directly output as data DATA.Y1 and DATA.Y3 without performing removal/replication of elastic symbols.

As a result, after the extra symbols are removed, the timings of data strings output from the elastic buffers 13-0, 13-1, 13-2, and 13-3 are different from each other.

Figure 16:
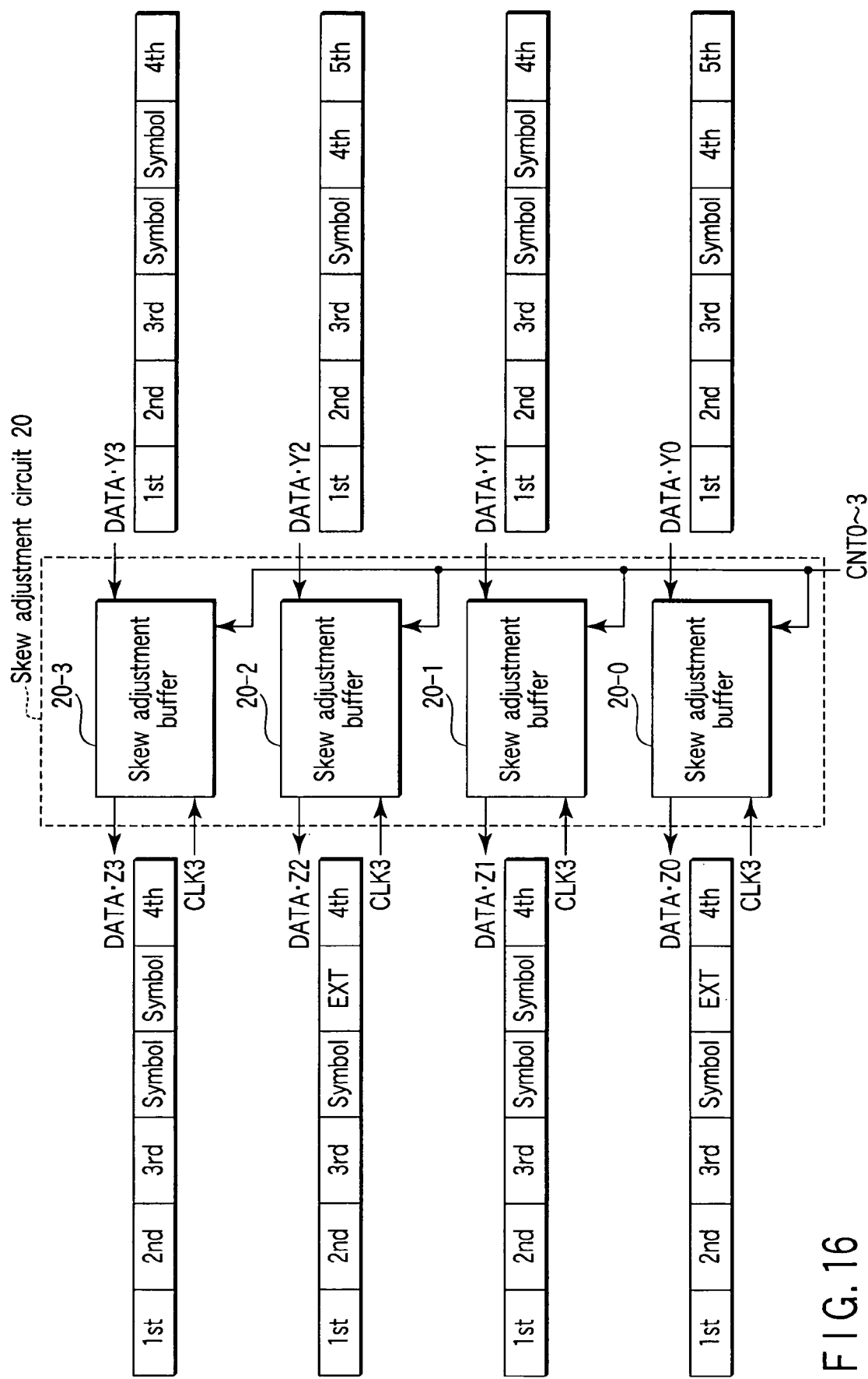
FIG. 16 is a diagram showing an outline of an operation of a skew adjustment circuit.

FIG. 16 shows a first example of an operation of a skew adjustment circuit which cancels a skew in FIG. 15.

The processes performed by the elastic buffers 13-0, 13-1, 13-2, and 13-3, as shown in FIG. 15, are "Removing Extra Symbol" on the signal paths corresponding to the data transmission paths 0 and 2, and are not "Removing/Replicate Extra Symbol" on the signal paths corresponding to the data transmission paths 1 and 3.

Processes performed by the skew adjustment buffers are determined on the basis of the above conditions.

The processes of the elastic buffers on the data transmission paths 0 and 2 are "Removing Extra Symbol". Therefore, depending on the condition in (2) B., "Replicate Extra Symbol" is performed by the skew adjustment circuit 20 on the data transmission paths 0 and 2.

The processes of the elastic buffers on the data transmission paths 1 and 3 are not "Removing/Replicate Extra Symbol". Therefore, depending on the condition in (2) C., "Removing/Replicate Extra Symbol" are not performed by the skew adjustment circuit 20 on the data transmission paths 1 and 3.

When the above processes are performed by the skew adjustment circuits 20, differences (skews) of data strings between the signal paths generated by the synchronizing processes in the elastic buffers are canceled. That is, as shown in FIG. 16, data DATA.Z0, DATA.Z1, DATA.Z2, DATA.Z3 are output from the skew adjustment buffers 20-0, 20-1, 20-2, and 20-3 at the same timing, respectively.

FIG. 17 shows a second example of an operation of the skew adjustment circuit which cancels a skew in FIG. 15.

The processes in the elastic buffers 13-0, 13-1, 13-2, and 13-3, as shown in FIG. 15, are "Removing Extra Symbol" on the signal paths corresponding to the data transmission paths 0 and 2, and are not "Removing/Replicate Extra Symbol" on the signal paths corresponding to the data transmission paths 1 and 3.

Therefore, processes performed by the skew adjustment buffers are determined on the basis of the above conditions.

The processes of the elastic buffers on the data transmission paths 0 and 2 are "Removing Extra Symbol". Therefore, depending on the condition in (1) C., "Removing/Replicate Extra Symbol" are not performed by the skew adjustment circuit 20 on the data transmission paths 0 and 2.

The processes of the elastic buffers on the data transmission paths 1 and 3 are not "Removing/Replicate Extra Symbol". "Removing Extra Symbol" is performed on the transmission paths except for the data transmission paths 1 and 3. Therefore, depending on the condition in (1) B., "Removing Extra Symbol" is performed by the skew adjustment circuit 20 on the data transmission paths 1 and 3.

When the above processes are performed by the skew adjustment circuits 20, differences (skews) of data strings between the signal paths generated by the synchronizing processes in the elastic buffers are canceled. That is, as shown in FIG. 17, data DATA.Z0, DATA.Z1, DATA.Z2, DATA.Z3 are output from the skew adjustment buffers 20-0, 20-1, 20-2, and 20-3 at the same timing, respectively.

FIG. 18 shows a second example in which a skew is generated between the plurality of signal paths.

In the elastic buffers 13-0, 13-1, 13-2, and 13-3 on the data transmission paths 1 and 3, extra symbols are independently replicated to cancel skews between the clock signals CLK2-1 and CLK2-3 and the clock signal CLK3.

Therefore, the data DATA.Y1 and DATA.Y3 in which extra symbols "EXT" are replicated are output from the elastic buffers 13-1 and 13-3. At this time, control signals CNT1 and CNT3 representing that the extra symbols are replicated are also output.

In the elastic buffers 13-0 and 13-2 on the data transmission paths 0 and 2, the data DATA.X0 and DATA.X2 are directly output as data DATA.Y0 and DATA.Y2 without performing removal/replication of elastic symbols.

As a result, after the extra symbols are replicated, the timings of data strings output from the elastic buffers 13-0, 13-1, 13-2, and 13-3 are different from each other.

FIG. 19 shows a first example of an operation of a skew adjustment circuit which cancels a skew in FIG. 18.

The processes performed by the elastic buffers 13-0, 13-1, 13-2, and 13-3, as shown in FIG. 18, are "Replicate Extra Symbol" on the signal paths corresponding to the data transmission paths 1 and 3, and are not "Removing/Replicate Extra Symbol" on the signal paths corresponding to the data transmission paths 0 and 2.

Processes performed by the skew adjustment buffers are determined on the basis of the above conditions.

The processes of the elastic buffers on the data transmission paths 1 and 3 are "Replicate Extra Symbol". Therefore, depending on the condition in (1) A., "Removing Extra Symbol" is performed by the skew adjustment circuit 20 on the data transmission paths 1 and 3.

The processes of the elastic buffers on the data transmission paths 0 and 2 are not "Removing/Replicate Extra Symbol". Therefore, depending on the condition in (1) C., "Removing/Replicate Extra Symbol" are not performed by the skew adjustment circuit 20 on the data transmission paths 0 and 2.

When the above processes are performed by the skew adjustment circuits 20, differences (skews) of data strings between the signal paths generated by the synchronizing processes in the elastic buffers are canceled. That is, as shown in FIG. 19, data DATA.Z0, DATA.Z1, DATA.Z2, DATA.Z3 are output from the skew adjustment buffers 20-0, 20-1, 20-2, and 20-3 at the same timing, respectively.

FIG. 20 shows a second example of an operation of the skew adjustment circuit which cancels a skew in FIG. 15.

The processes in the elastic buffers 13-0, 13-1, 13-2, and 13-3, as shown in FIG. 18, are "Replicate Extra Symbol" on the signal paths corresponding to the data transmission paths 1 and 3, and are not "Removing/Replicate Extra Symbol" on the signal paths corresponding to the data transmission paths 0 and 2.

Therefore, processes performed by the skew adjustment buffers are determined on the basis of the above conditions.

The processes of the elastic buffers on the data transmission paths 1 and 3 are "Replicate Extra Symbol". Therefore, depending on the condition in (2) C., "Removing/Replicate Extra Symbol" are not performed by the skew adjustment circuit 20 on the data transmission paths 1 and 3.

The processes of the elastic buffers on the data transmission paths 0 and 2 are not "Removing/Replicate Extra Symbol". "Replicate Extra Symbol" is performed on the transmission paths except for the data transmission paths 0 and 2. Therefore, depending on the condition in (2) A., "Replicate Extra Symbol" is performed by the skew adjustment circuit 20 on the data transmission paths 0 and 2.

When the above processes are performed by the skew adjustment circuits 20, differences (skews) of data strings between the signal paths generated by the synchronizing processes in the elastic buffers are canceled. That is, as shown in FIG. 20, data DATA.Z0, DATA.Z1, DATA.Z2, DATA.Z3 are output from the skew adjustment buffers 20-0, 20-1, 20-2, and 20-3 at the same timing, respectively.

The principle of "Removing/Replicate Extra Symbol" in a skew adjustment buffer in the skew adjustment circuit will be described below.

Figure 21:
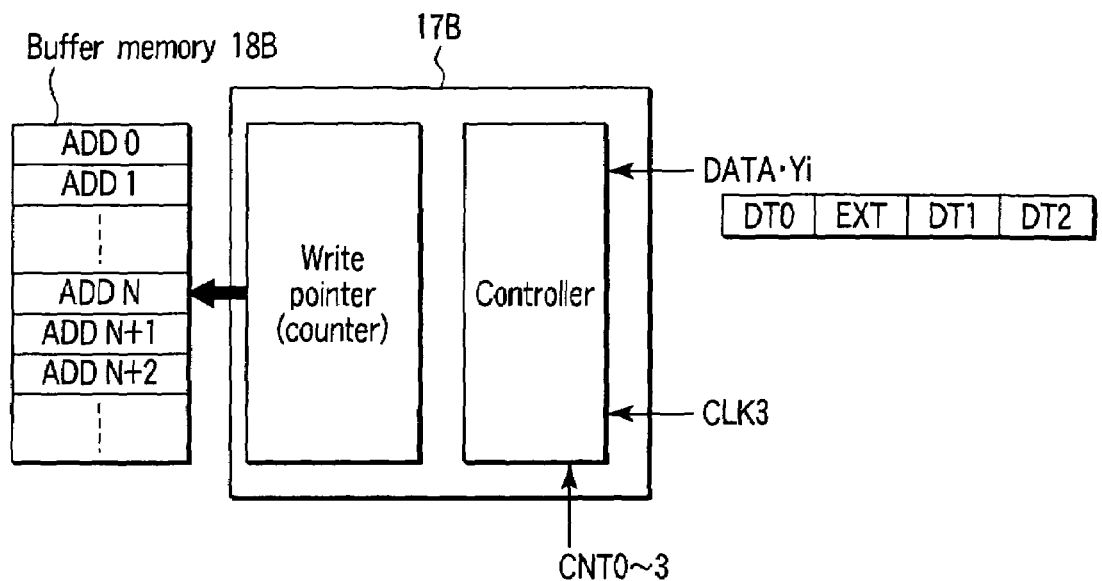
FIG. 21 is a diagram showing an outline of an operation of a write pointer.

FIG. 21 shows an example of a write control circuit in the skew adjustment buffer.

The write pointer, for example, has a counter which increments the address ADDj of the buffer memory 18B on which data is written one by one in principle. An arrow in FIG. 21 denotes the write address ADDj designated by a write pointer.

Figure 22:
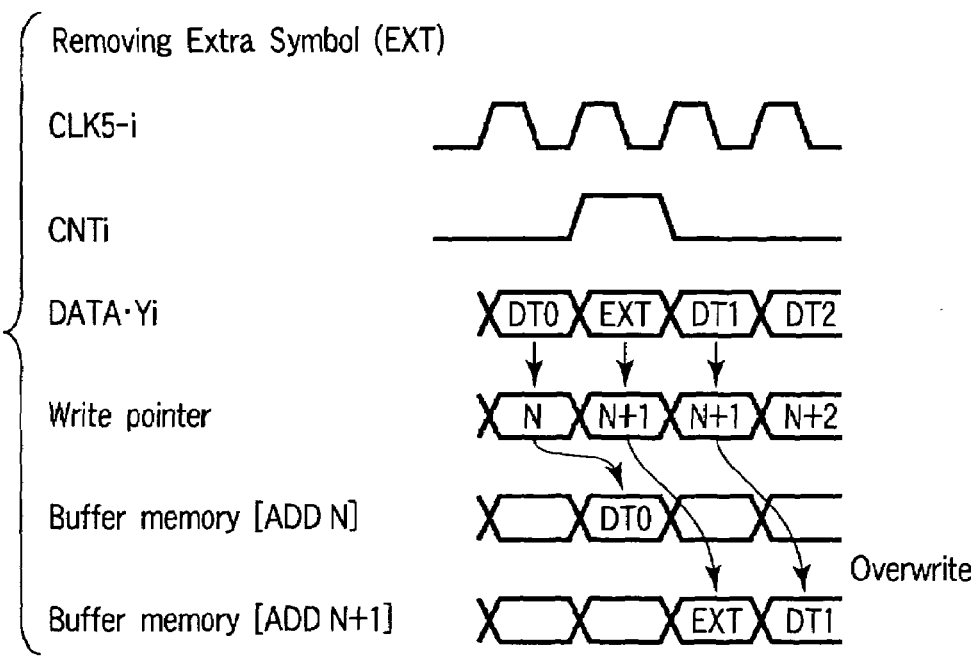
FIG. 22 is a waveform chart showing a signal waveform obtained when an extra symbol is removed.

FIG. 22 shows an operation of the skew adjustment circuit when "Removing Extra Symbol".

For example, when the control signal CNTi becomes "H", removal of an extra symbol "EXT" is executed by the skew adjustment circuit.

An address ADD N+1 is designated by the write pointer, and an extra symbol "EXT" is written at the address ADD N+1. In general, the address designated by the write pointer is incremented by only one to obtain an address ADD N+2. However, when the extra symbol "EXT" is to be removed, the increment of the address designated by the write pointer is stopped for the duration of one clock of the clock signal CLK3.

As a result, data "DT1" is written at the address ADD N+1, and the data "DT1" is overwritten on the extra symbol "EXT" which has been written at the address ADD N+1.

Figure 23:
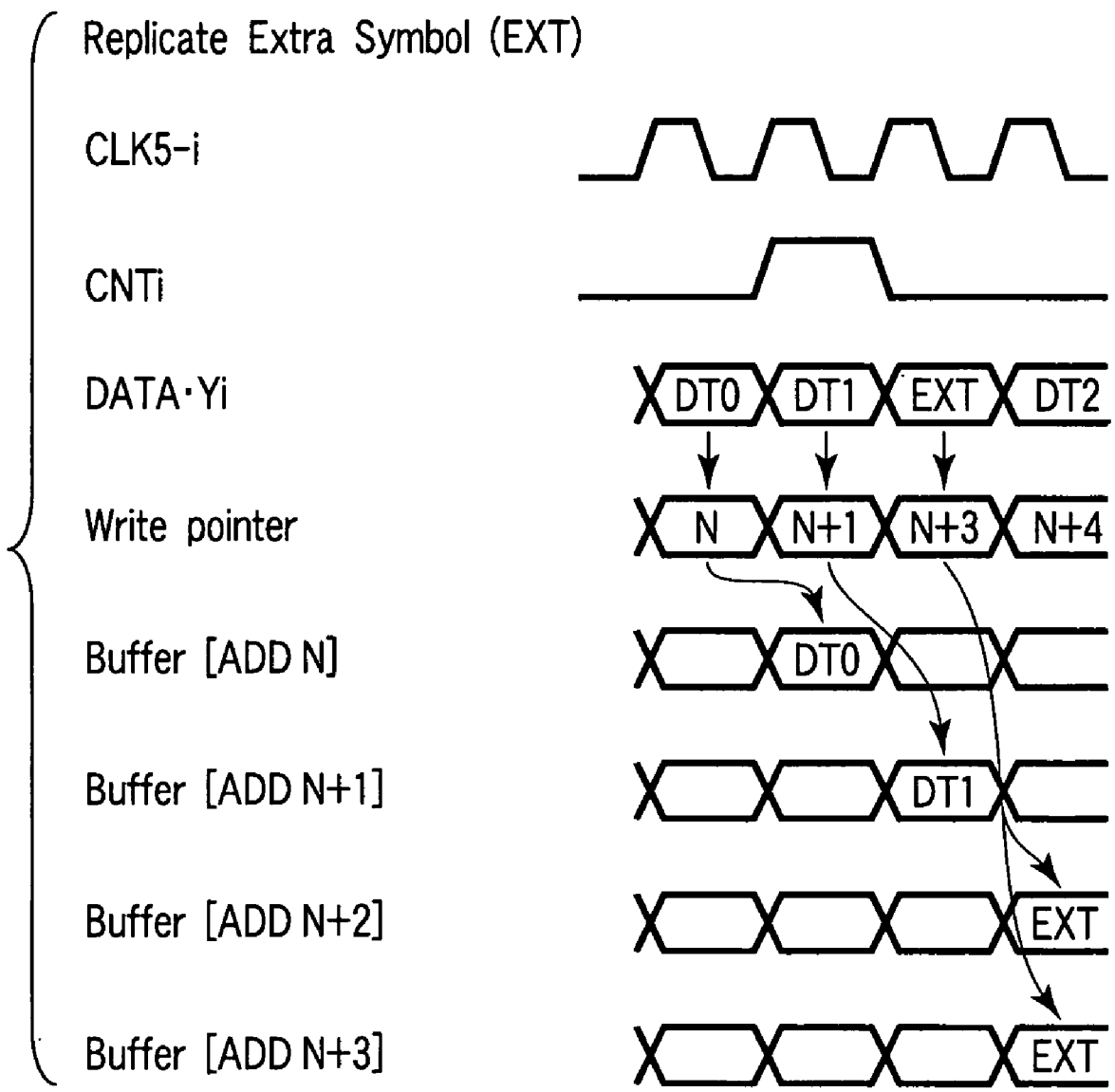
FIG. 23 is a waveform chart showing a signal waveform obtained when an extra symbol is replicated.

FIG. 23 shows an operation of the skew adjustment circuit when "Replicate Extra Symbol" is performed.

For example, when the control signal CNTi becomes "H", replication of the extra symbol "EXT" is executed by the skew adjustment circuit.

The address ADD N+1 is designated by the write pointer, and the data "DT1" is written at the address ADD N+1. Thereafter, the address designated by the write pointer is incremented by +2 (in general, +1).

As a result, the extra symbol "EXT" is written at the addresses ADD N+2 and ADD N+3 at the same time.

In the serial communication system having a plurality of data transmission paths according to an example of the present invention, two processes performed by the skew adjustment circuit, i.e., "Removing Extra Symbol" and "Replicate Extra Symbol" can be selected.

Figure 24:
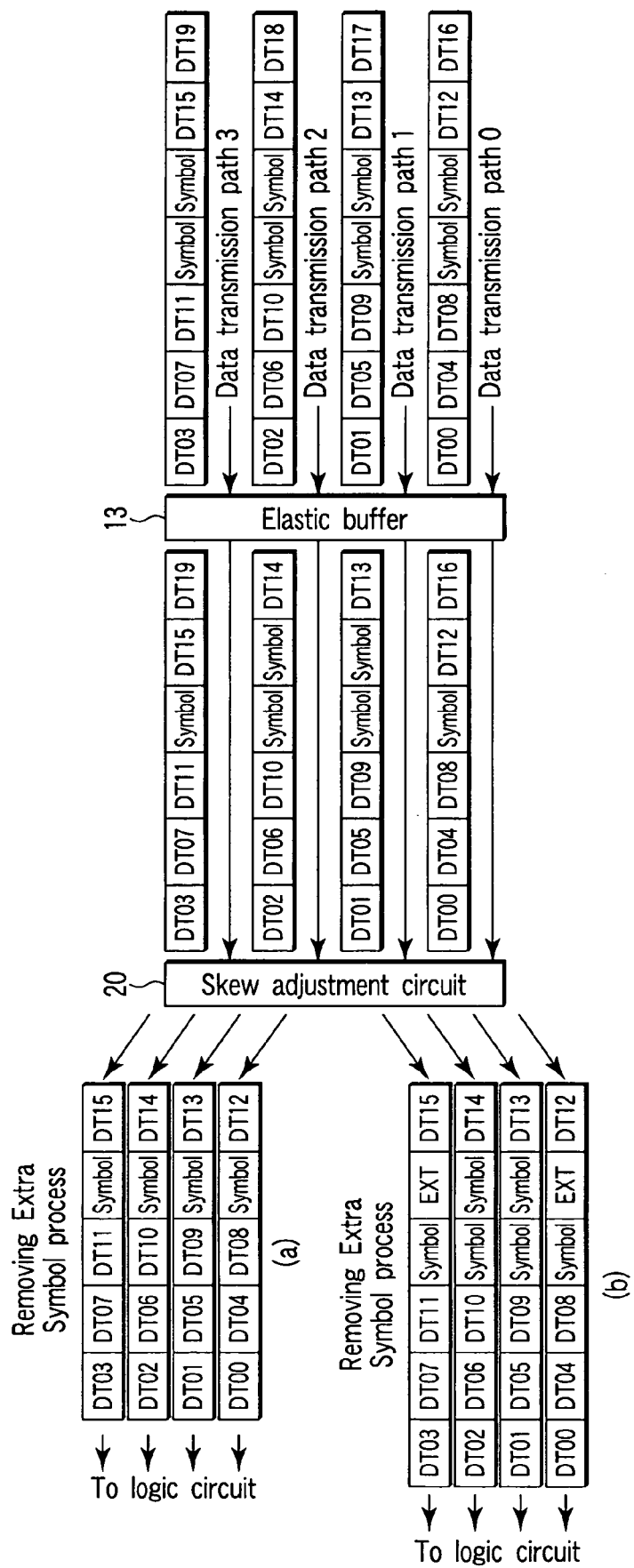
FIG. 24 is a diagram showing a manner in which removal/replication of an extra symbol can be selected.

For example, as shown in FIG. 24, when "Removing Extra Symbol" is performed in the elastic buffer 13 corresponding to the data transmission paths 0 and 3, the skew adjustment circuit 20 can perform the following two processes.

One of them is a process which performs "Removing Extra Symbol" in the skew adjustment buffer corresponding to the data transmission paths 1 and 2. In this case, as shown in FIG. 24(a), on the signal paths corresponding to all the data transmission paths 0, 1, 2, and 3, one of the extra symbols is deleted. For this reason, a difference (skew) of data strings generated between the transmission paths in the elastic buffer 13 can be corrected.

The other is a process of performing "Replicate Extra Symbol" in the skew adjustment buffer corresponding to the data transmission paths 0 and 3. In this case, as shown in FIG. 24(b), on the signal paths corresponding to all the data transmission paths 0, 1, 2, and 3, one extra symbol is added. For this reason, a difference (skew) of data strings generated between the transmission paths in the elastic buffer 13 can be corrected.

Figure 25:
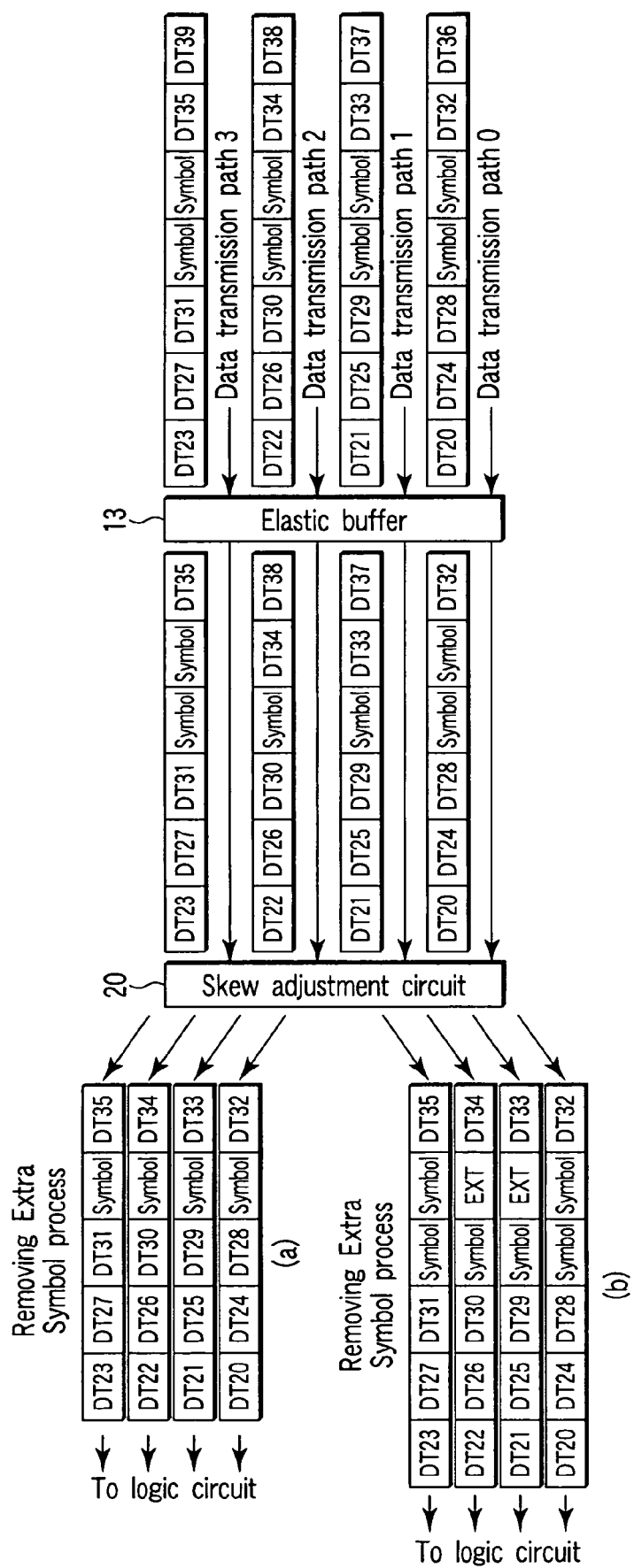
FIG. 25 is a diagram showing a manner in which removal/replication of an extra symbol can be selected.

For example, as shown in FIG. 25, when "Removing Extra Symbol" is performed in the elastic buffer 13 corresponding to the data transmission paths 1 and 2, the skew adjustment circuit 20 can perform the following two processes.

One is a process of performing "Removing Extra Symbol" in the skew adjustment buffer corresponding to data transmission paths 0 and 3. In this case, as shown in FIG. 25(a), on the signal paths corresponding to all the data transmission paths 0, 1, 2, and 3, one extra symbol is removed. For this reason, a difference (skew) of data strings generated between the transmission paths in the elastic buffer 13 can be corrected.

The other is a process of performing "Replicate Extra Symbol" in the skew adjustment buffer corresponding to the data transmission paths 1 and 2. In this case, as shown in FIG. 25(b), on the signal paths corresponding to all the data transmission paths 0, 1, 2, and 3, one extra symbol is added. For this reason, a difference (skew) of data strings generated between the transmission paths in the elastic buffer 13 can be corrected.

For example, as shown in FIG. 26, when "Replicate Extra Symbol" is performed in the elastic buffer 13 corresponding to the data transmission paths 0 and 3, the skew adjustment circuit 20 can perform the following two processes.

One is a process of performing "Replicate Extra Symbol" in the skew adjustment buffer corresponding to data transmission paths 1 and 2. In this case, as shown in FIG. 26(b), on the signal paths corresponding to all the data transmission paths 0, 1, 2, and 3, one extra symbol is added. For this reason, a difference (skew) of data strings generated between the transmission paths in the elastic buffer 13 can be corrected.

The other is a process of performing "Removing Extra Symbol" in the skew adjustment buffer corresponding to the data transmission paths 0 and 3. In this case, as shown in FIG. 26(a), on the signal paths corresponding to all the data transmission paths 0, 1, 2, and 3, one extra symbol is removed. For this reason, a difference (skew) of data strings generated between the transmission paths in the elastic buffer 13 can be corrected.

For example, as shown in FIG. 27, when "Replicate Extra Symbol" is performed in the elastic buffer 13 corresponding to the data transmission paths 1 and 2, the skew adjustment circuit 20 can perform the following two processes.

One is a process of performing "Replicate Extra Symbol" in the skew adjustment buffer corresponding to data transmission paths 0 and 3. In this case, as shown in FIG. 27(b), on the signal paths corresponding to all the data transmission paths 0, 1, 2, and 3, one extra symbol is added. For this reason, a difference (skew) of data strings generated between the transmission paths in the elastic buffer 13 can be corrected.

The other is a process of performing "Removing Extra Symbol" in the skew adjustment buffer corresponding to the data transmission paths 1 and 2. In this case, as shown in FIG. 27(a), on the signal paths corresponding to all the data transmission paths 0, 1, 2, and 3, one extra symbol is removed. For this reason, a difference (skew) of data strings generated between the transmission paths in the elastic buffer 13 can be corrected.

In FIGS. 24 to 27, a timing at which "Removing/Replicate Extra Symbol" is determined by an extra symbol "Symbol" generated by a semiconductor integrated circuit on the data transmission side.

FIG. 28 shows a relationship between an address designated by a write pointer and an address designated by a read point in the skew adjustment buffer.

In the skew adjustment buffer 20-i, serial data is written in the buffer memory 18B by using the write control circuit 17B, and the serial data is read from the buffer memory 18B by using the read control circuit 19B, so that timing control of data strings is performed.

In order to keep the operation of the skew adjustment buffer 20-i normal, as the first condition, a write operation must be always performed prior to a read operation.

For example, in FIG. 28, when addresses are designated by the write pointer and the read point in a direction from the address ADD0 to the address ADD7, and when the designation operations are repeated, the address designated by the read pointer catches up to the address designated by the write pointer to make it impossible to perform normal control.

As the second condition, the writing operation must not catch up to the read operation.

For example, in FIG. 28, when addresses are designated by the write pointer and the read point in a direction from the address ADD0 to the address ADD7, and when the designation operations are repeated, the address designated by the write pointer catches up to the address designated by the read pointer to make it impossible to perform normal control.

However, as described above, in the skew adjustment buffer 20-$i$, when "Removing Extra Symbol" is performed, the movement of the write pointer is delayed time corresponding to one clock.

Therefore, in the skew adjustment buffer 20-$i$, when only the same process, e.g., "Removing Extra Symbol" is repeated, the position of the read pointer should catch up to the position of the write pointer (in this case, this status is called an "underflow" because the data in the buffer memory is removed).

In the skew adjustment buffer 20-$i$, when "Replicate Extra Symbol" is performed, the write pointer moves for one clock in a length corresponding to two addresses.

Therefore, in the skew adjustment buffer 20-$i$, when the same process, e.g., only "Removing Extra Symbol" is repeated, the position of the write pointer should catch up to the position of the read pointer (in this case, the status is called an "overflow" because the data in the buffer memory is full).

In the communication system according to the example of the present invention, a concept which is a "buffer status" is employed. The buffer status represents a relative positional relationship between the position of the write pointer (address designated by the write pointer) and the position of the read pointer (address designated by the read pointer).

In the communication system according to the example of the present invention, on the basis of the buffer status, the position of the write pointer and the position of the read pointer are controlled such that underflow or overflow does not occur. More specifically, in timing control in the skew adjustment buffer, on the basis of the buffer status, execution of "Removing Extra Symbol" or execution of "Replicate Extra Symbol" is determined.

FIG. 29 shows an outline of the buffer status.

A read pointer is fixed to a predetermined position, e.g., "0" on the buffer status. In the initial state, the write pointer is located at a position farthest from the position "0" of the read pointer, i.e., "3" or "4". In this example, the write pointer is arranged at "4" in the initial state.

In this case, the buffer status in FIG. 29, numbers 0 to 7 are drawn as straight as a line. However, it is considered that numbers "0" and "7" are adjacent to each other to repetitively select the addresses ADD0 to ADD7 of the buffer memory. Therefore, the position farthest from the position "0" of the read pointer is "3" or "4".

In this buffer status, first, when "Replicate Extra Symbol" is performed, an increment of the write pointer is +2.

This means that the write pointer moves in such a direction that a write operation catches up to a read operation, i.e., that the relationship between the write pointer and the read pointer is overflow. On the buffer status in FIG. 29, the write pointer moves to "5".

Second, when "Removing Extra Symbol" is performed, the increment of the write pointer is stopped for duration of one clock.

This means that the write pointer moves in such a direction that a read operation catches up to a write operation, i.e., that the relationship between the write pointer and the read pointer is underflow. On the buffer status in FIG. 29, the write pointer moves to "3".

In the example of the present invention, in order to prevent the operation of the skew adjustment buffer 20-$i$ in FIG. 28 from being broken, in timing control, on the basis of the buffer status, a process of the skew adjustment buffer 20-$i$ is determined.

For example, it is assumed that the position of the write pointer on the buffer status is represented by Pw and that the position of the read pointer on the buffer status is represented by Pr. In this case, when the value of Pw−Pr is 4 or more, "Removing Extra Symbol" is performed. When the value of Pw−Pr is smaller than 4, "Replicate Extra Symbol" is performed.

A concrete operation of the buffer status will be described below.

Figure 30:
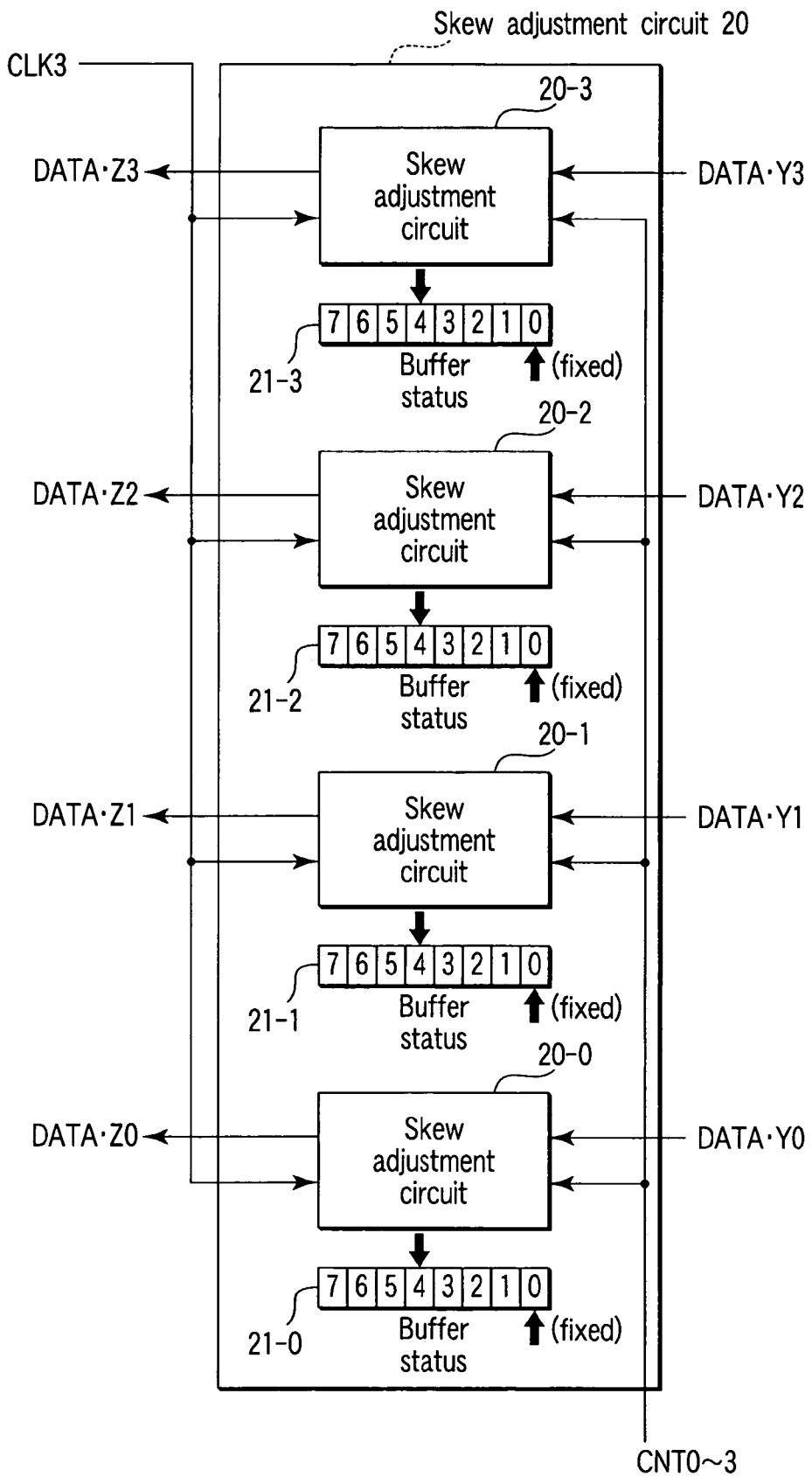
FIG. 30 is a diagram showing an initial state of a buffer status.

FIG. 30 shows a skew adjustment circuit according to the example of the present invention.

The buffer statuses 21-$i$ ($i$=0, 1, 2, and 3) are arranged in the skew adjustment buffers 20-$i$, respectively.

FIG. 30 shows a manner of an initial state of the buffer status.

In general, an elastic buffer arranged on the input stage of the skew adjustment circuit performs an elastic process ("Removing/Replicate Extra Symbol") according to a predetermined rule.

For example, as shown in FIG. 24, when an elastic buffer corresponding to the data transmission paths 0 and 3 performs "Removing Extra Symbol" in the first synchronizing process, as shown in FIG. 25, an elastic buffer corresponding to the data transmission paths 1 and 2 performs "Removing Extra Symbol" in the second synchronizing process.

More specifically, in this case, when the two synchronizing processes are completed, the elastic buffers corresponding to all the data transmission paths 0, 1, 2, and 3 perform "Removing Extra Symbol".

In consideration of these circumstances, the states of the buffer statuses 21-$i$ of all the skew adjustment buffer 20-$i$ are equal to each other, the contents of processes performed by the skew adjustment buffer 20-$i$ are determined.

For example, as shown in FIG. 24, in the first timing control, it is assumed that the skew adjustment circuit 20 performs "Removing Extra Symbol" to data from the data transmission paths 1 and 2 (FIG. 24($a$)). In this case, as shown in FIG. 25, in the second timing control, the skew adjustment circuit 20 performs "Removing Extra Symbol" to data from the data transmission paths 0 and 3 (FIG. 25($b$)).

At this time, all the buffer statuses 21-$i$ have the same state (state in which the positions of the write pointer and the read pointer are equal to each other).

Figure 31:
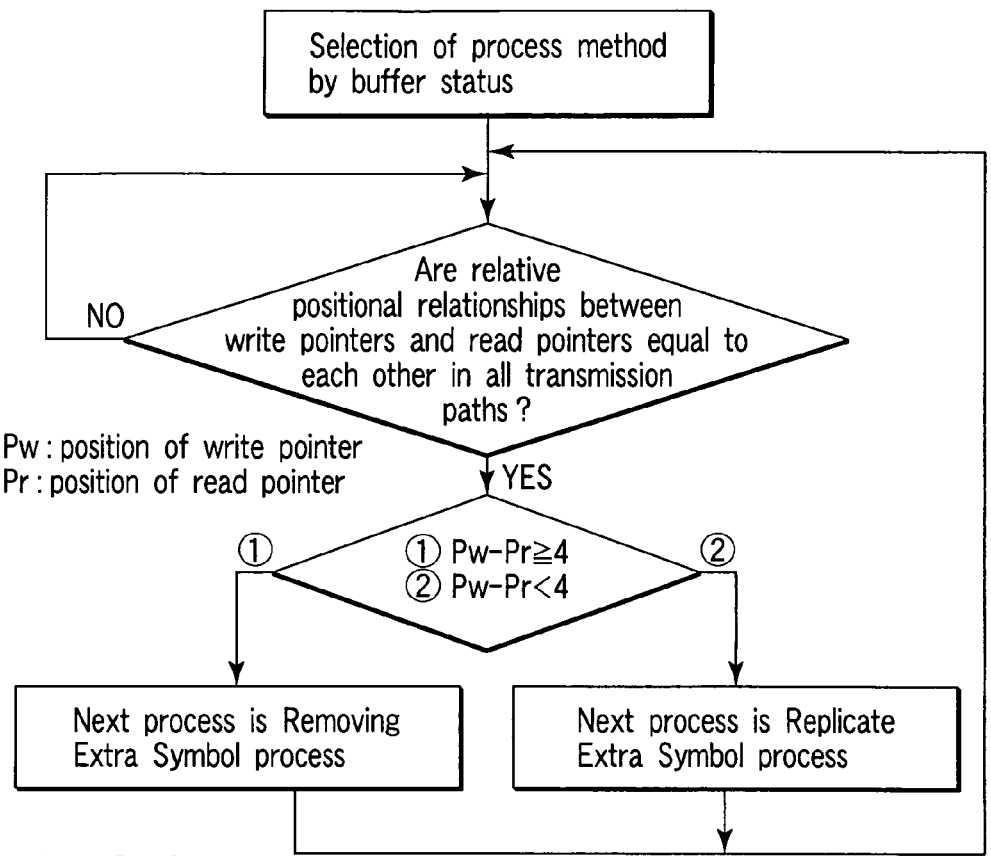
FIG. 31 is a flow chart for determining a state of the buffer status.

Therefore, as shown in the flow chart in FIG. 31, the skew adjustment buffers 20-$i$ determine, on the basis of the buffer statuses 21-$i$, the contents of processes performed by the skew adjustment buffers 20-$i$. That is, the skew adjustment buffers 20-$i$ determine execution of "Removing Extra Symbol" or execution of "Replicate Extra Symbol".

In this manner, in each timing control, the next process need not be determined. For this reason, a control method becomes simple.

More specifically, the process in the elastic buffer is regularly performed. However, when a buffer status is changed each time an extra symbol is detected, buffer statuses on the signal paths may operate at random.

According to the example of the present invention, since the buffer statuses of the signal paths operate in relation to each other, the control method becomes simple.

A specific example thereof will be explained below.

In the initial state in FIG. 30, a case in which a data string as shown in FIG. 24 is input to the skew adjustment circuit 20.

Figure 32:
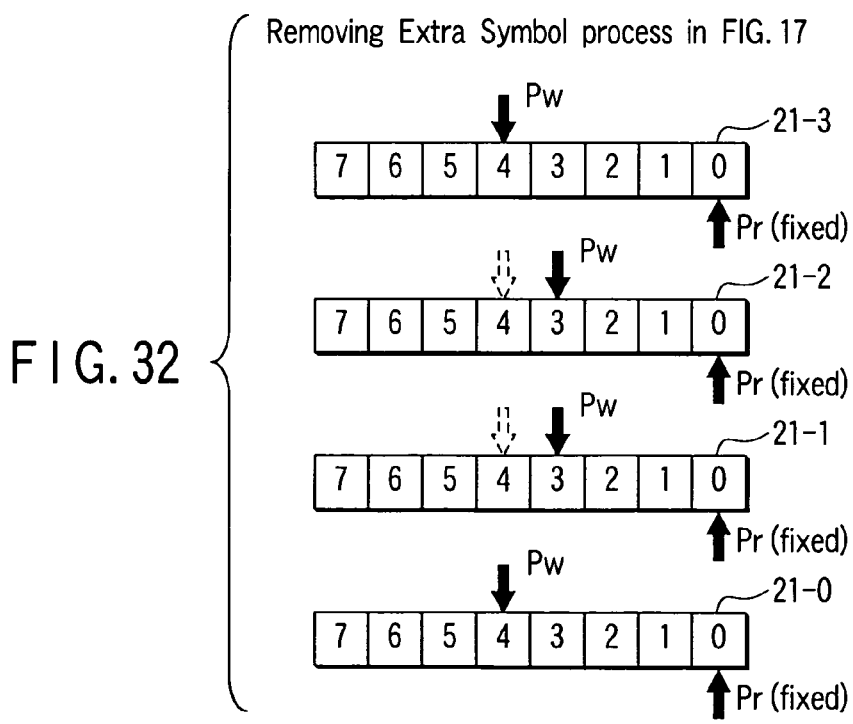
FIG. 32 is a diagram showing a buffer status obtained after an extra symbol is removed.

In this case, according to the condition in FIG. 31, in the skew adjustment circuit 20, "Removing Extra Symbol" is performed to data from the data transmission paths 1 and 2 (FIG. 24(a)). At this time, as shown in FIG. 32, in the buffer statuses 21-1 and 21-2 corresponding to the data transmission paths 1 and 2, the position Pw of the write pointer moves from "4" to "3".

Thereafter, a data string as shown in FIG. 25 is input to the skew adjustment circuit 20.

In this case, according to the condition in FIG. 31, the relative positional relationships between the write pointers and the read pointers are not equal to each other in all the buffer statuses 21-0, 21-1, 21-2, and 21-3. The skew adjustment circuit 20 necessarily performs "Removing Extra Symbol" to data from the data transmission paths 0 and 3 (FIG. 25(a)).

Figure 33:
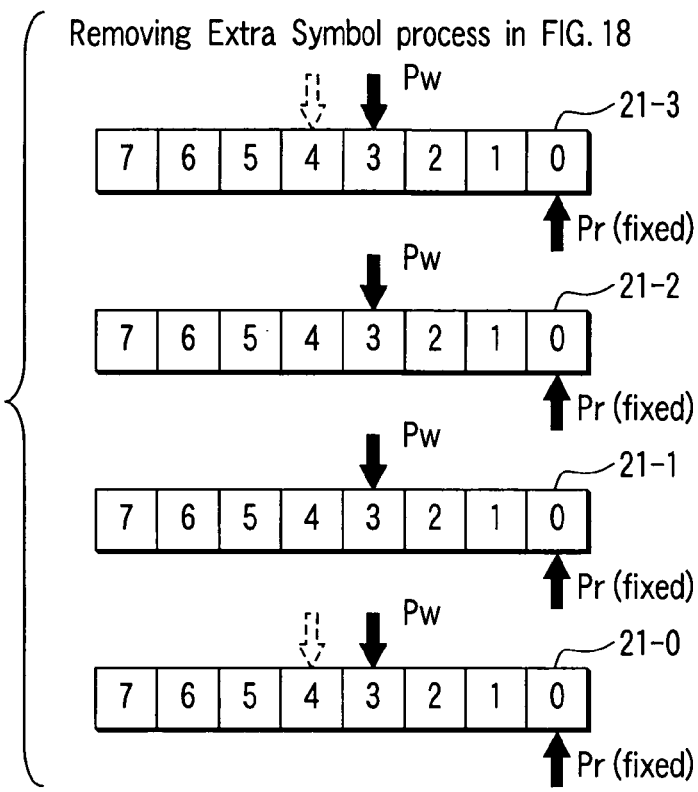
FIG. 33 is a diagram showing a buffer status obtained after an extra symbol is removed.

At this time, as shown in FIG. 33, in the buffer statuses 21-0 and 21-3 corresponding to the data transmission paths 0 and 3, the position Pw of the write pointer moves from "4" to "3".

Figure 34:
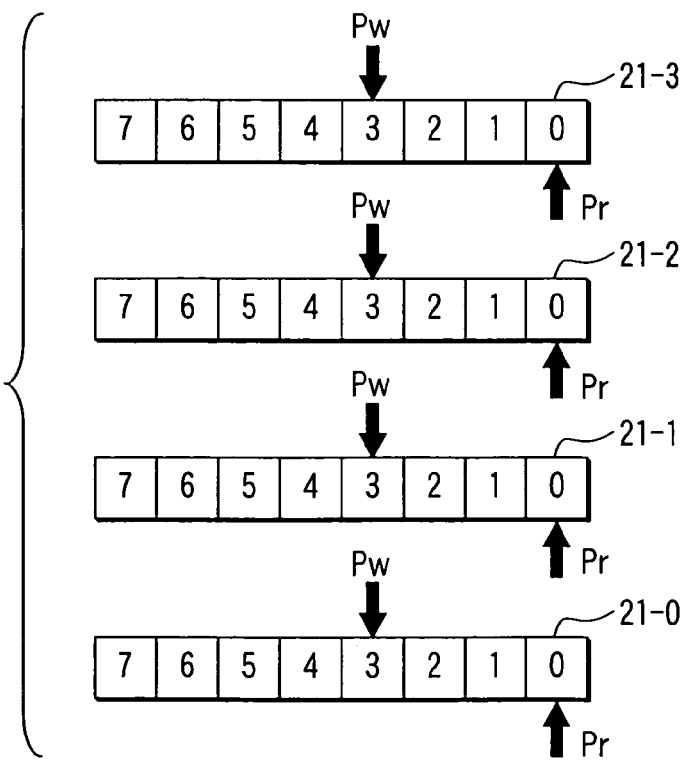
FIG. 34 is a diagram showing a manner in which the states of all the buffer statuses are equal to each other.

In this stage, as shown in FIG. 34, the states of all the buffer statuses 21-0, 21-1, 21-2, and 21-3 are equal to each other, i.e., the positional relationships between the write pointers and the read pointers are equal to each other.

Thereafter, a case in which a data string as shown in FIG. 24 is input to the skew adjustment circuit 20 will be described below.

Figure 35:
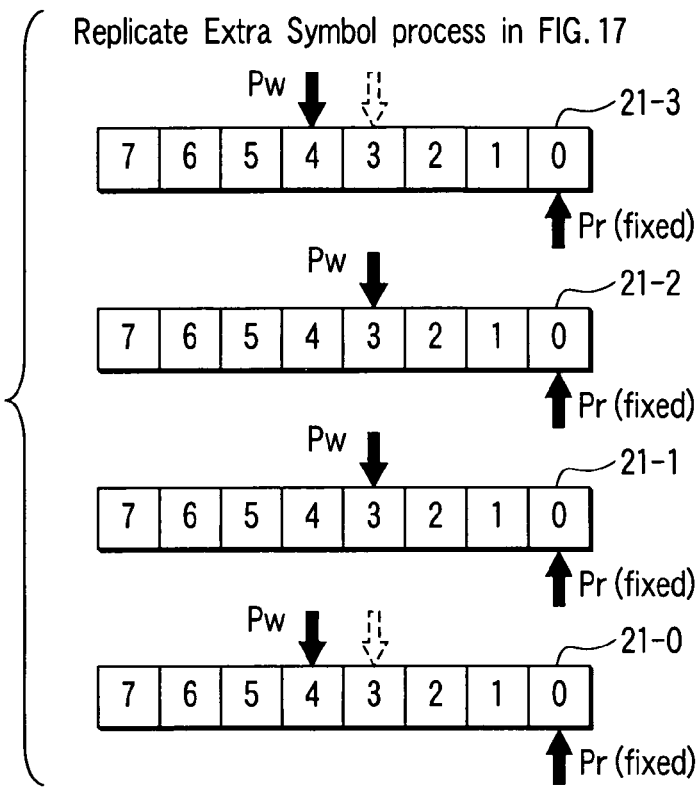
FIG. 35 is a diagram showing a buffer status obtained after an extra symbol is replicated.

In this case, according to the condition in FIG. 31, in the skew adjustment circuit 20, "Replicate Extra Symbol" is performed to data from the data transmission paths 0 and 3 (FIG. 24(b)). At this time, as shown in FIG. 35, in the buffer statuses 21-0 and 21-3 corresponding to the data transmission paths 0 and 3, the position Pw of the write pointer moves from "3" to "4".

Thereafter, a data string as shown in FIG. 25 is input to the skew adjustment circuit 20.

In this case, according to the condition in FIG. 31, the relative positional relationships between the write pointers and the read pointers are not equal to each other in all the buffer statuses 21-0, 21-1, 21-2, and 21-3. The skew adjustment circuit 20 necessarily performs "Replicate Extra Symbol" to data from the data transmission paths 1 and 2 (FIG. 25(b)).

Figure 36:
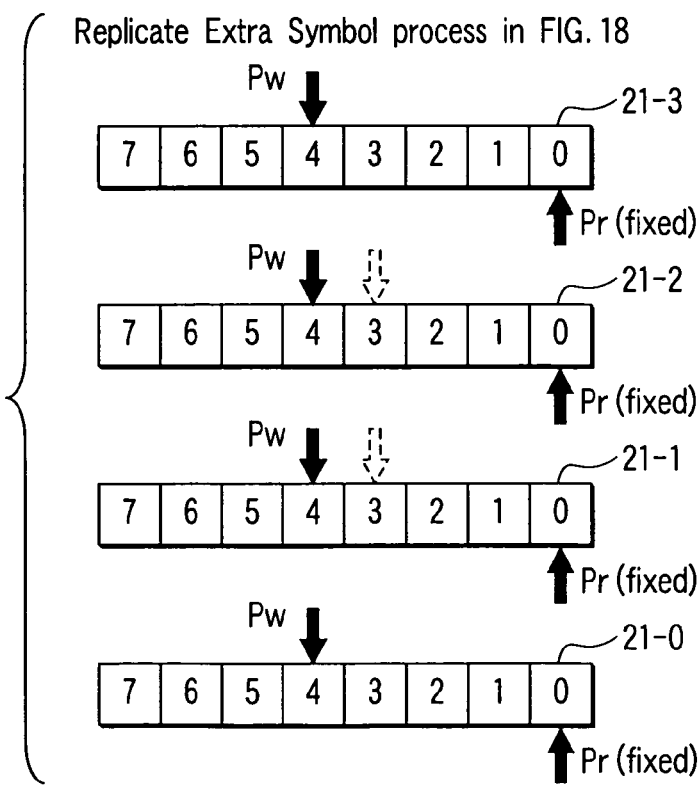
FIG. 36 is a diagram showing a buffer status obtained after an extra symbol is replicated.

At this time, as shown in FIG. 36, in the buffer statuses corresponding to the data transmission paths 1 and 2, the position Pw of the write pointer moves from "3" to "4".

In this manner, in the example of the present invention, when the state of the buffer status satisfies $Pw-Pr \geq 4$, "Removing Extra Symbol" is performed, the state of the buffer status is changed from such a direction that the status gets away from overflow to such a direction that the status gets close to underflow. When the state of the buffer status satisfies $Pw-Pr<4$, "Replicate Extra Symbol" is performed, the state of the buffer status is changed from such a direction that the status gets away from underflow to such a direction that the status gets close to overflow.

These processes avoid the operations of the skew adjustment buffers 20-$i$ in the skew adjustment circuit 20 from being broken.

The method of controlling an address pointer or the method of controlling a buffer status described in FIGS. 28 to 36 can be applied to not only a skew adjustment buffer constituting a skew adjustment circuit but also an elastic buffer arranged on the input stage of the skew adjustment circuit.

According to the example of the present invention, in the serial communication system having a plurality of data transmission paths, when synchronizing processes by the elastic buffers are performed to a plurality of signal paths corresponding to the plurality of data transmission paths, respectively, even though a timing difference (skew) of data strings is generated between the plurality of signal paths, the skew can be canceled.

The serial communication system according to the example of the present invention can easily cope with an increase or decrease in number of data transmission paths. A semiconductor integrated circuit serving as a target of the example of the present invention can be applied to various ICs such as a logic IC, a memory merged logic IC, a memory IC, and a system IC. With respect to a buffer configuration, for example, the example of the present invention can be applied to a double buffer configuration using a memory cell array.

In the example of the present invention, the configuration of an elastic buffer, a synchronizing process performed by the elastic buffer, and a data communication system from the semiconductor integrated circuit IC1 to the semiconductor integrated circuit IC2 are not limited to the above embodiment.

The serial data communication system according to the example of the present invention is effectively applied to, especially, a semiconductor integrated circuit having a plurality of transmission paths to which an elastic buffer is connected to perform timing control of data communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit for use in a serial communication system having a plurality of data transmission paths, comprising:
   a logic circuit:
   a plurality of signal paths, which are arranged in relation to said plurality of data transmission paths, to transfer data to the logic circuit;
   a plurality of elastic buffers which are arranged on the signal paths, respectively and which perform synchronizing operations for the respective signal paths; and
   a skew adjustment circuit which performs a synchronizing operation between said plurality of signal paths by removing/replicating extra symbols;
   wherein the skew adjustment circuit comprises a plurality of skew adjustment buffers arranged in relation to said plurality of signal paths, and said plurality of skew adjustment buffers perform the removing/replicating extra symbols in the respective signal paths.

2. The semiconductor integrated circuit according to claim 1, wherein said plurality of elastic buffers output control signals representing the contents of processes performed by the elastic buffers, and said plurality of skew adjustment buffers determine the contents of the processes performed by the skew adjustment buffers on the basis of the control signals.

3. The semiconductor integrated circuit according to claim 2, wherein each of said plurality of elastic buffers comprises a buffer memory, a write control circuit which designates a write address of the buffer memory, and a read control circuit which designates a read address of the buffer memory, and the control signal is output from the write control circuit.

4. The semiconductor integrated circuit according to claim 2, wherein each of said plurality of skew adjustment buffers comprises a buffer memory, a write control circuit which designates a write address of the buffer memory, and a read control circuit which designates a read address of the buffer memory, and the control signal is output from the write control circuit.

5. The semiconductor integrated circuit according to claim 4, wherein the write address is theoretically incremented one by one in synchronism with a clock signal, and when the extra symbol is removed, the write address is stopped for duration of one clock of the clock signal.

6. The semiconductor integrated circuit according to claim 4, wherein the write address is theoretically incremented one by one in synchronism with a clock signal, and when the extra symbol is replicated, the write address is incremented by two.

7. The semiconductor integrated circuit according to claim 4, wherein the read address is always incremented one by one in synchronism with a clock signal.

8. The semiconductor integrated circuit according to claim 4, wherein each of said plurality of skew adjustment buffers comprises a buffer status representing a positional relationship between the write address and the read address, and designation of the write address is determined on the basis of a state of the buffer address.

9. The semiconductor integrated circuit according to claim 8, wherein each of said plurality of skew adjustment buffers execute removal/replication of the extra symbol on the basis of a state of the buffer address.

10. The semiconductor integrated circuit according to claim 8, wherein, in all said plurality of skew adjustment buffers, the same process is performed until the states of the buffer statuses are equal to each other, and the contents of next processes performed by said plurality of skew adjustment buffers are determined when the states of the buffer statuses in all said plurality of skew adjustment buffers.

11. The semiconductor integrated circuit according to claim 8, wherein the write address is determined such that the write address is not equal to the read address.

12. A serial communication system comprising:
a first IC and a second IC which are connected to each other by a serial communication system constituted by a plurality of data transmission paths, wherein the second IC comprises:
a logic circuit;
a plurality of signal paths, which are arranged in relation to said plurality of data transmission paths, to transfer data to the logic circuit;
a plurality of elastic buffers which are arranged on the signal paths, respectively and which perform synchronizing operations for the respective signal paths; and
a skew adjustment circuit which performs a synchronizing operation between said plurality of signal paths by removing/replicating extra symbols;
wherein the skew adjustment circuit comprises a plurality of skew adjustment buffers arranged in relation to said plurality of signal paths, and said plurality of skew adjustment buffers perform the removing/replicating extra symbols in the respective signal paths.

13. A skew adjustment buffer comprising:
a buffer memory;
a write control circuit which designates a write address of the buffer memory;
a read control circuit which designates a read address of the buffer memory; and
a buffer status which represents a positional relationship between the write address and the read address,
wherein designation of the write address is determined on the basis of removing/replicating an extra symbol.

14. The skew adjustment buffer according to claim 13, wherein the write address is theoretically incremented one by one in synchronism with a clock signal, and when the extra symbol is removed, the write address is stopped for duration of one clock of the clock signal.

15. The skew adjustment buffer according to claim 13, wherein the write address is theoretically incremented one by one in synchronism with a clock signal, and when the extra symbol is replicated, the write address is incremented by two.

16. The skew adjustment buffer according to claim 13, wherein the read address is always incremented one by one in synchronism with a clock signal.

17. The skew adjustment buffer according to claim 13, wherein the write address is determined such that the write address is equal to the read address.

* * * * *